(12) United States Patent
Sheets et al.

(10) Patent No.: US 11,055,694 B2
(45) Date of Patent: *Jul. 6, 2021

(54) SECURE REMOTE PAYMENT TRANSACTION PROCESSING

(71) Applicant: Visa International Service Association, San Francisco, CA (US)

(72) Inventors: John Sheets, San Francisco, CA (US); Kim Wagner, Sunnyvale, CA (US); Christian Aabye, Foster City, CA (US); Frederick Liu, Oakland, CA (US); Igor Karpenko, Sunnyvale, CA (US); Glenn Powell, Fremont, CA (US); Kiushan Pirzadeh, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,706

(22) Filed: Nov. 27, 2019

(65) Prior Publication Data

US 2020/0097948 A1 Mar. 26, 2020

Related U.S. Application Data

(63) Continuation of application No. 14/332,245, filed on Jul. 15, 2014, now Pat. No. 10,607,212.

(Continued)

(51) Int. Cl.
*G06Q 20/32* (2012.01)
*G06Q 20/28* (2012.01)
*G06Q 20/38* (2012.01)

(52) U.S. Cl.
CPC ....... *G06Q 20/3278* (2013.01); *G06Q 20/322* (2013.01); *G06Q 20/3829* (2013.01)

(58) Field of Classification Search
USPC .................................................... 705/50–79
See application file for complete search history.

(56) References Cited

U.S. PATENT DOCUMENTS 4,642,648 A 2/1987 Hulland et al.
5,878,138 A 3/1999 Yacobi
(Continued)

FOREIGN PATENT DOCUMENTS

AU 2010279705 10/2014
AU 2014290143 6/2018
(Continued)

OTHER PUBLICATIONS

Schneier ("Applied Cryptography", previously attached in U.S. Appl. No. 14/332,245 as PDF file (Year: 1996).*

(Continued)

*Primary Examiner* — James D Nigh
*Assistant Examiner* — Margaret M Neubig
(74) *Attorney, Agent, or Firm* — Kilpatrick Townsend & Stockton LLP

(57) ABSTRACT

Embodiments of the present invention are directed to methods, apparatuses, computer readable media and systems for securely processing remote transactions. One embodiment of the invention is directed to a method of processing a remote transaction initiated by a mobile device comprising a server computer receiving a payment request including encrypted payment information. The encrypted payment information being generated by a mobile payment application of the mobile device and being encrypted using a third party key. The method further comprises decrypting the encrypted payment information using the third party key, determining a transaction processor public key associated with the payment information, and re-encrypting the payment information using the transaction processor public key.

(Continued)

The method further comprises sending a payment response including the re-encrypted payment information to a transaction processor. The transaction processor decrypts the re-encrypted payment information using a transaction processor private key and initiates a payment transaction.

18 Claims, 14 Drawing Sheets

Related U.S. Application Data

(60) Provisional application No. 61/880,154, filed on Sep. 19, 2013, provisional application No. 61/871,814, filed on Aug. 29, 2013, provisional application No. 61/863,869, filed on Aug. 8, 2013, provisional application No. 61/957,948, filed on Jul. 15, 2013.

(56) References Cited

U.S. PATENT DOCUMENTS

| | | | |
|---|---|---|---|
| 5,987,132 A * | 11/1999 | Rowney | G06Q 30/0611 705/26.4 |
| 6,192,473 B1 | 2/2001 | Ryan, Jr. et al. | |
| 6,230,272 B1 | 5/2001 | Lockhart et al. | |
| 6,286,099 B1 * | 9/2001 | Kramer | G06Q 20/04 705/76 |
| 6,931,382 B2 | 8/2005 | Laage et al. | |
| 7,043,489 B1 | 5/2006 | Kelley | |
| 7,096,354 B2 * | 8/2006 | Wheeler | G06Q 20/4014 705/64 |
| 7,149,801 B2 | 12/2006 | Burrows et al. | |
| 7,337,324 B2 | 2/2008 | Benaloh et al. | |
| 7,353,382 B2 | 4/2008 | Labrou et al. | |
| 7,562,222 B2 | 7/2009 | Gasparini et al. | |
| 7,578,436 B1 | 8/2009 | Kiliccote | |
| 7,801,826 B2 | 9/2010 | Labrou et al. | |
| 7,849,020 B2 | 12/2010 | Johnson | |
| 8,121,942 B2 | 2/2012 | Carlson et al. | |
| 8,121,956 B2 | 2/2012 | Carlson et al. | |
| 8,224,702 B2 | 7/2012 | Mengerink et al. | |
| 8,280,777 B2 | 10/2012 | Mengerink et al. | |
| 8,313,022 B2 | 11/2012 | Hammad et al. | |
| 8,417,642 B2 | 4/2013 | Oren | |
| 8,498,908 B2 | 7/2013 | Mengerink et al. | |
| 8,538,845 B2 | 9/2013 | Liberty | |
| 8,583,494 B2 | 11/2013 | Fisher | |
| 8,589,291 B2 | 11/2013 | Carlson et al. | |
| 8,589,691 B1 | 11/2013 | Hackborn et al. | |
| 8,601,266 B2 | 12/2013 | Aabye et al. | |
| 8,606,638 B2 | 12/2013 | Dragt | |
| 8,606,700 B2 | 12/2013 | Carlson et al. | |
| 8,606,720 B1 | 12/2013 | Baker et al. | |
| 8,620,754 B2 | 12/2013 | Fisher | |
| 8,635,157 B2 | 1/2014 | Smith et al. | |
| 8,646,059 B1 | 2/2014 | von Behren et al. | |
| 8,732,089 B1 | 5/2014 | Fang et al. | |
| 8,898,089 B2 | 11/2014 | Faith et al. | |
| 9,154,477 B2 * | 10/2015 | Cambridge | H04W 12/033 |
| 9,294,468 B1 * | 3/2016 | Kilbourn | H04L 9/3263 |
| 9,646,303 B2 | 5/2017 | Karpenko et al. | |
| 2004/0059686 A1 | 3/2004 | Levesque | |
| 2004/0078422 A1 | 4/2004 | Toomey | |
| 2004/0250074 A1 | 12/2004 | Kilian-Kehr | |
| 2005/0172229 A1 | 8/2005 | Reno et al. | |
| 2005/0222961 A1 | 10/2005 | Staib et al. | |
| 2006/0133615 A1 | 6/2006 | Bade et al. | |
| 2006/0167812 A1 | 7/2006 | Bhambri et al. | |
| 2006/0235795 A1 | 10/2006 | Johnson et al. | |
| 2006/0271496 A1 * | 11/2006 | Balasubramanian | G06Q 20/3821 705/64 |
| 2007/0022301 A1 | 1/2007 | Nicholson et al. | |
| 2007/0162366 A1 | 7/2007 | Tanaka et al. | |
| 2008/0034428 A1 | 2/2008 | Bejar et al. | |
| 2009/0106160 A1 | 4/2009 | Skowronek | |
| 2009/0112747 A1 | 4/2009 | Mullen et al. | |
| 2009/0307140 A1 | 12/2009 | Mardikar | |
| 2010/0082481 A1 | 4/2010 | Lin et al. | |
| 2010/0088518 A1 | 4/2010 | Dottax et al. | |
| 2010/0169659 A1 | 7/2010 | Shnowske et al. | |
| 2010/0211507 A1 | 8/2010 | Aabye et al. | |
| 2010/0217709 A1 | 8/2010 | Aabye et al. | |
| 2010/0250442 A1 | 9/2010 | Coppinger | |
| 2010/0306076 A1 | 12/2010 | Taveau et al. | |
| 2011/0016320 A1 | 1/2011 | Bergsten et al. | |
| 2011/0035317 A1 | 2/2011 | Carlson et al. | |
| 2011/0131102 A1 | 6/2011 | Wang | |
| 2011/0137802 A1 * | 6/2011 | Spies | G06Q 20/367 705/65 |
| 2011/0201306 A1 | 8/2011 | Ali Al-Harbi | |
| 2011/0231648 A1 | 9/2011 | Robertson et al. | |
| 2011/0295753 A1 | 12/2011 | Reno | |
| 2012/0072350 A1 | 3/2012 | Goldthwaite et al. | |
| 2012/0123882 A1 | 5/2012 | Carlson et al. | |
| 2012/0143767 A1 | 6/2012 | Abadir | |
| 2012/0143772 A1 | 6/2012 | Abadir | |
| 2012/0158580 A1 | 6/2012 | Eram et al. | |
| 2012/0203664 A1 | 8/2012 | Torossian et al. | |
| 2012/0203666 A1 | 8/2012 | Torossian et al. | |
| 2012/0226582 A1 | 9/2012 | Hammad | |
| 2012/0233004 A1 | 9/2012 | Bercaw | |
| 2012/0233685 A1 | 9/2012 | Palanigounder et al. | |
| 2012/0265688 A1 | 10/2012 | Dinan | |
| 2012/0289188 A1 | 11/2012 | Marcus et al. | |
| 2012/0300932 A1 | 11/2012 | Cambridge et al. | |
| 2012/0303503 A1 | 11/2012 | Cambridge et al. | |
| 2012/0303961 A1 | 11/2012 | Kean et al. | |
| 2013/0007849 A1 * | 1/2013 | Coulter | G06F 21/313 726/4 |
| 2013/0019098 A1 | 1/2013 | Gupta et al. | |
| 2013/0041831 A1 | 2/2013 | Das | |
| 2013/0054473 A1 | 2/2013 | Jan et al. | |
| 2013/0060706 A1 | 3/2013 | Aabye et al. | |
| 2013/0066788 A1 | 3/2013 | Goodrich et al. | |
| 2013/0080276 A1 | 3/2013 | Granbery | |
| 2013/0110717 A1 | 5/2013 | Kobres | |
| 2013/0117185 A1 | 5/2013 | Collison et al. | |
| 2013/0124290 A1 | 5/2013 | Fisher | |
| 2013/0124291 A1 | 5/2013 | Fisher | |
| 2013/0124364 A1 | 5/2013 | Mittal | |
| 2013/0124421 A1 | 5/2013 | Deng | |
| 2013/0138525 A1 | 5/2013 | Bercaw | |
| 2013/0151405 A1 | 6/2013 | Head et al. | |
| 2013/0159186 A1 | 6/2013 | Brudnicki et al. | |
| 2013/0166456 A1 | 6/2013 | Zhang et al. | |
| 2013/0173736 A1 | 7/2013 | Krzeminski et al. | |
| 2013/0185202 A1 | 7/2013 | Goldthwaite et al. | |
| 2013/0191290 A1 | 7/2013 | Glendenning | |
| 2013/0212017 A1 | 8/2013 | Bangia | |
| 2013/0246203 A1 | 9/2013 | Laracey | |
| 2013/0254028 A1 | 9/2013 | Salci | |
| 2013/0254117 A1 * | 9/2013 | von Mueller | G06Q 20/3829 705/71 |
| 2013/0275308 A1 | 10/2013 | Paraskeva et al. | |
| 2013/0290718 A1 | 10/2013 | Zhuang et al. | |
| 2013/0297504 A1 | 11/2013 | Nwokolo et al. | |
| 2013/0308778 A1 | 11/2013 | Fosmark et al. | |
| 2013/0311382 A1 | 11/2013 | Fosmark et al. | |
| 2013/0317982 A1 | 11/2013 | Mengerink et al. | |
| 2014/0007213 A1 | 1/2014 | Sanin et al. | |
| 2014/0013106 A1 | 1/2014 | Redpath | |
| 2014/0013114 A1 | 1/2014 | Redpath | |
| 2014/0019367 A1 * | 1/2014 | Khan | G06Q 20/425 705/75 |
| 2014/0022676 A1 | 1/2014 | Marotta et al. | |
| 2014/0040137 A1 | 2/2014 | Carlson et al. | |
| 2014/0040628 A1 | 2/2014 | Fort et al. | |
| 2014/0188738 A1 | 7/2014 | Huxham | |
| 2014/0222676 A1 | 8/2014 | Lee et al. | |
| 2014/0236842 A1 * | 8/2014 | Salminen | G06Q 20/326 705/75 |

(56) References Cited

U.S. PATENT DOCUMENTS

| | | | |
|---|---|---|---|
| 2014/0282834 A1* | 9/2014 | Guinan | H04L 63/0823 726/1 |
| 2015/0019443 A1 | 1/2015 | Sheets et al. | |
| 2015/0052064 A1 | 2/2015 | Karpenko et al. | |
| 2015/0088756 A1 | 3/2015 | Makhotin et al. | |
| 2017/0200156 A1 | 7/2017 | Karpenko et al. | |
| 2017/0221056 A1 | 8/2017 | Karpenko et al. | |

FOREIGN PATENT DOCUMENTS

| | | |
|---|---|---|
| CN | 1394408 | 1/2003 |
| CN | 1842813 | 10/2006 |
| CN | 101072384 | 11/2007 |
| CN | 101563870 | 10/2009 |
| CN | 101567780 | 10/2009 |
| CN | 101588577 | 11/2009 |
| CN | 101834946 | 9/2010 |
| CN | 101853544 | 10/2010 |
| CN | 102341817 | 2/2012 |
| CN | 102456193 | 5/2012 |
| CN | 102480725 | 5/2012 |
| CN | 102609841 | 7/2012 |
| CN | 102685073 | 9/2012 |
| CN | 102685703 | 9/2012 |
| CN | 102685730 | 9/2012 |
| CN | 102742211 | 10/2012 |
| CN | 103116848 | 5/2013 |
| CN | 105556553 | 5/2016 |
| CN | 105684010 | 6/2016 |
| CN | 105745678 | 7/2016 |
| EP | 2600275 | 6/2013 |
| EP | 3022700 | 5/2016 |
| EP | 3033725 | 6/2016 |
| EP | 3047437 | 7/2016 |
| IN | 201647013251 | 8/2016 |
| JP | 2003044765 | 2/2003 |
| JP | 2007513529 | 5/2007 |
| JP | 2010526368 | 7/2010 |
| JP | 2012252665 | 12/2012 |
| JP | 2013512503 | 4/2013 |
| JP | 2014522067 | 8/2014 |
| JP | 6371390 | 6/2018 |
| KR | 20030084294 | 11/2003 |
| KR | 20060054419 A | 5/2006 |
| KR | 20060117902 | 11/2006 |
| KR | 20070083087 | 8/2007 |
| KR | 20090102752 | 9/2009 |
| KR | 20100111987 | 10/2010 |
| KR | 1020100111987 | 10/2010 |
| KR | 20120076593 A | 7/2012 |
| KR | 20120106238 | 9/2012 |
| KR | 20120110926 | 10/2012 |
| KR | 1630573 | 3/2016 |
| KR | 1643075 | 4/2016 |
| RU | 2376635 | 12/2009 |
| RU | 2394275 | 7/2010 |
| RU | 2467501 | 11/2012 |
| RU | 2016104765 | 8/2017 |
| RU | 2016115043 | 10/2017 |
| RU | 2663476 | 6/2018 |
| RU | 2674329 | 12/2018 |
| SG | 10201800291 | 2/2018 |
| SG | 11201602093 T | 1/2019 |
| WO | 2006128215 | 12/2006 |
| WO | 2009138848 | 11/2009 |
| WO | 2010033968 | 3/2010 |
| WO | 2011017196 | 2/2011 |
| WO | 2011017196 | 4/2011 |
| WO | 2012151590 | 11/2012 |
| WO | 2012167941 | 12/2012 |
| WO | 2013086423 | 6/2013 |
| WO | 2015009765 | 1/2015 |
| WO | 2015023999 | 2/2015 |
| WO | 2015042548 | 3/2015 |

OTHER PUBLICATIONS

ANSI-X9.63 ; previously attached in U.S. Appl. No. 14/332,245 as a PDF file (Year: 1993).*
NPL2, ("The System for Secure Mobile Payment Transactions", Behzad Pouralinazar, 2013, attached as PDF file, see specifically pp. 67-70, downloaded from https://pdfs.semanticscholar.org/dc51/46b01ab79c25dbdcf94c436dce6068b4ff33.pdf (Year: 2013).*
CN201480056590.8 , "Office Action", dated Apr. 29, 2020, 15 pages.
IN201647013251 , "First Examination Report", dated Jun. 3, 2020, 6 pages.
U.S. Appl. No. 15/490,191 , "Non-Final Office Action", dated Nov. 30, 2020, 14 pages.
CN201480056590.8 , "Office Action", dated Oct. 23, 2020, 9 pages.
EP14825781.9 , "Office Action", dated Oct. 21, 2020, 4 pages.
KR10-2016-7006730 , "Notice of Decision to Grant", dated Nov. 25, 2020, 4 pages.
KR2020-7016682 , "Office Action", dated Sep. 9, 2020, 7 pages.
U.S. Appl. No. 15/490,191 , Final Office Action, dated May 14, 2020, 35 pages.
U.S. Appl. No. 14/493,247 , Notice of Allowance, dated Jun. 24, 2020, 10 pages.
U.S. Appl. No. 15/471,800 , Final Office Action, dated Jul. 9, 2020, 32 pages.
Application No. CN201480050582.2 , Notice of Decision to Grant, dated Jul. 6, 2020, 4 pages.
EP14845716.1 , "Summons to Attend Oral Proceedings", Aug. 13, 2020, 8 pages.
Application No. KR2016-7006730 , Office Action, dated Jun. 18, 2020, 7 pages.
AU2014306440 , "Second Examination Report", dated Nov. 27, 2019, 3 pages.
AU2014321178 , "Second Examination Report", dated Nov. 28, 2019, 4 pages.
CN201480056590.8 , "Office Action", dated Dec. 13, 2019, 17 pages.
CN201480063714.5 , "Office Action", dated Dec. 31, 2019, 13 pages.
CN201480050582.2 , "Office Action", dated Feb. 25, 2020, 21 pages.
EP14825781.9 , "Summons to Attend Oral Proceedings", Apr. 17, 2020, 13 pages.
EP14836208.0 , "Summons to Attend Oral Proceedings", Feb. 17, 2020, 17 pages.
KR10-2016-7003736 , "Notice of Decision to Grant", dated Mar. 10, 2020, 3 pages.
KR10-2018-7035630 , "Notice of Decision to Grant", dated Mar. 3, 2020, 5 pages.
Wikipedia , "X.509", Available Online at: URL:https://en.wikipedia.org/w/index.php?title—X.5098,oldid=567241886, Aug. 5, 2013, 12 pages.
"ANSI-X9.63", Jul. 5, 1998, 125 pages.
"ANXI-X9.63", (1993).
"Public Key Certificate", Wikipedia, Available Online at: URL:https://en.wikipedia.org/w/index.php?title=Public_key_certificate&oldid=560998490, Jun. 22, 2013, 8 pages.
U.S. Appl. No. 12/787,788 , "Final Office Action", dated Jul. 2, 2013, 12 pages.
U.S. Appl. No. 12/787,788 , "Non-Final Office Action", dated Oct. 10, 2012, 17 pages.
U.S. Appl. No. 12/787,788 , "Non-Final Office Action", dated Jul. 10, 2015, 18 pages.
U.S. Appl. No. 14/332,245 , "Final Office Action", dated Sep. 14, 2018, 32 pages.
U.S. Appl. No. 14/332,245 , "Non-Final Office Action", dated Nov. 16, 2017, 28 pages.
U.S. Appl. No. 14/332,245 , "Notice of Allowability", dated Jan. 6, 2020, 3 pages.
U.S. Appl. No. 14/332,245 , "Notice of Allowance", dated Aug. 28, 2019, 19 pages.
U.S. Appl. No. 14/332,245 , "Restriction Requirement", dated Jun. 7, 2017, 7 pages.

(56) References Cited

OTHER PUBLICATIONS

U.S. Appl. No. 14/461,227 , "Final Office Action", dated Dec. 9, 2016, 18 pages.
U.S. Appl. No. 14/461,227 , "Non-Final Office Action", dated Feb. 3, 2016, 24 pages.
U.S. Appl. No. 14/461,227 , "Non-Final Office Action", dated Jul. 11, 2016, 25 pages.
U.S. Appl. No. 14/461,227 , "Notice of Allowance", dated Jan. 5, 2017, 17 pages.
U.S. Appl. No. 14/493,247 , "Final Office Action", dated May 18, 2016, 14 pages.
U.S. Appl. No. 14/493,247 , "Final Office Action", dated Jan. 16, 2018, 20 pages.
U.S. Appl. No. 14/493,247 , "Non-Final Office Action", dated Jan. 20, 2016, 12 pages.
U.S. Appl. No. 14/493,247 , "Non-Final Office Action", dated Aug. 28, 2017, 25 pages.
U.S. Appl. No. 15/471,800 , "Non-Final Office Action", dated Jan. 24, 2020, 32 pages.
U.S. Appl. No. 15/490,191 , "Non-Final Office Action", dated Oct. 24, 2019, 27 pages.
AU2014290143 , "First Examiner Report", dated Oct. 20, 2017, 3 pages.
AU2014290143 , "Notice of Acceptance", dated Feb. 14, 2018, 3 pages.
AU2014306440 , "First Examination Report", dated Jun. 12, 2019, 3 pages.
AU2014321178 , "First Examination Report", dated Jun. 13, 2019, 3 pages.
AU2018203139 , "First Examination Report", dated Oct. 14, 2019, 5 pages.
CA2,918,066 , "Office Action", dated Nov. 3, 2017, 4 pages.
CA2,918,066 , "Office Action", dated Oct. 26, 2018, 4 pages.
CA2,918,066 , "Office Action", dated Sep. 26, 2019, 4 pages.
CN201480050582.2 , "Office Action", dated Sep. 27, 2019, 17 pages.
CN201480050582.2 , "Office Action", dated Mar. 21, 2019, 20 pages.
CN201480056590.8 , "Office Action", dated Dec. 27, 2018, 15 pages.
CN201480056590.8 , "Office Action", dated Jul. 29, 2019, 23 pages.
CN201480063714.5 , "Office Action", dated Jan. 31, 2019, 16 pages.
CN201480063714.5 , "Office Action", dated Aug. 12, 2019, 19 pages.
EP14825781.9 , "Extended European Search Report", dated Feb. 23, 2017, 7 pages.
EP14825781.9 , "Office Action", dated Sep. 13, 2019, 7 pages.
EP14836208.0 , "Extended European Search Report", dated Mar. 30, 2017, 9 pages.
EP14836208.0 , "Office Action", dated Jul. 22, 2019, 13 pages.
EP14845716.1 , "Extended European Search Report", dated Feb. 2, 2017, 8 pages.
EP14845716.1 , "Office Action", dated Jul. 19, 2019, 6 pages.
EP14845716.1 , "Office Action", dated May 9, 2018, 6 pages.
JP2016-527053 , "Notice of Decision to Grant", dated Jun. 12, 2018, 3 pages.
JP2016-527053 , "Office Action", dated Feb. 28, 2018, 9 pages.
JP2018-132704 , "Office Action", dated Nov. 1, 2019, 6 pages.
KR10-2018-7035630 , "Office Action", dated Sep. 3, 2019, 9 pages.
KR2016-7003736 , "Office Action", dated Oct. 8, 2018, 10 pages.
KR2016-7003736 , "Office Action", dated Dec. 18, 2017, 15 pages.
KR2016-7003736 , "Office Action", dated Jul. 18, 2018, 9 pages.
PCT/US2014/046764 , "International Preliminary Report on Patentability", dated Jan. 28, 2016, 10 pages.
PCT/US2014/046764 , "International Search Report and Written Opinion", dated Nov. 19, 2014, 9 pages.
PCT/US2014/051371 , "International Preliminary Report on Patentability", dated Feb. 25, 2016, 7 pages.
PCT/US2014/051371 , "International Search Report and Written Opinion", dated Nov. 26, 2014, 8 pages.
PCT/US2014/056837 , "International Preliminary Report on Patentability", dated Mar. 31, 2016, 6 pages.
PCT/US2014/056837 , "International Search Report and Written Opinion", dated Jan. 9, 2015, 7 pages.
Pouralinazar , "The System for Secure Mobile Payment Transactions", Available online at: https://pdfs.semanticscholar.org/dc51/46b01ab79c25dbdcf94c436dce6068b4ff33.pdf, 2013, 78 pages.
RU2016104765 , "Notice of Decision to Grant", dated Oct. 4, 2018, 20 pages.
RU2016104765 , "Office Action", dated May 18, 2018, 12 pages.
RU2016115043 , "Notice of Decision to Grant", dated May 22, 2018, 20 pages.
Schneier , "Applied Cryptography", John Wiley & Sons, "1996_ Applied Cryptography_ Schneier_ extract. pdf", 1996.
SG11201602093T , "Notice of Decision to Grant", dated Nov. 28, 2018, 4 pages.
U.S. Appl. No. 15/471,800 , "Non-Final Office Action", dated Jan. 27, 2021, 32 pages.
EP21151953.3 , "Extended European Search Report", dated May 14, 2021, 13 pages.
KR10-2021-7005596 , "Office Action", dated Apr. 12, 2021, 12 pages.

\* cited by examiner

SECURE REMOTE PAYMENT TRANSACTION PROCESSING

CROSS-REFERENCES TO RELATED APPLICATIONS

This application is a continuation of 14/332,245, filed Jul. 15, 2014, now U.S. patent application Ser. No. 10,607,212, which claims the benefit of priority to U.S. Provisional Application No. 61/957,948, filed Jul. 15, 2013, U.S. Provisional Application No. 61/863,869, filed Aug. 8, 2013, U.S. Provisional Application No. 61/871,814, filed Aug. 29, 2013, and U.S. Provisional Application No. 61/880,154, filed Sep. 19, 2013, which are all hereby incorporated by reference in their entirety for all purposes.

BACKGROUND

An increasing number of consumers are using devices configured to use near-field communication (NFC) and other proximity communication protocols for payment transactions. For example, a consumer's mobile device may comprise NFC hardware and a secure element or other secure storage medium for storing sensitive account information. In order to conduct a payment transaction, the consumer may place the mobile device in proximity to a point of sale terminal, access device, or other proximity or contactless communication reader. The transaction may then be processed using secure payment information stored on the secure storage medium, without the user requiring to provide a physical credit card or manually enter a credit card number.

Consumers may also conduct online payment transactions using mobile devices. For example, a consumer may download a merchant application and select some items to purchase. Then, to conduct the payment transaction, the consumer may enter payment information using a physical or on-screen keyboard. However, the manual entry of payment information to merchant applications is often redundant, as the consumer may already have payment information stored in a secure storage medium. Further, the manual entry of payment information may introduce security risks such as a vulnerability to eavesdropping.

Accordingly, there is a need to allow a consumer to use secure payment credentials stored on a mobile device to initiate and process a remote transaction. However, the payment credentials stored on the mobile device are sensitive and the merchant applications on the mobile device may be open to hacking, spoofing, and other security threats. As such, there is a need to ensure the payment credentials stored securely on the mobile device are secured against potential malicious applications and threats on the mobile device during payment transaction processing.

Furthermore, traditional remote transactions have limited security features and a higher risk of fraud because a consumer is not present at a merchant or service provider for verification that the payment credentials have not been stolen or intercepted and are not being used by a malicious third party. Accordingly, there is a need to increase the security of remote transactions initiated from mobile devices.

Embodiments of the present invention address these problems and other problems individually and collectively.

BRIEF SUMMARY

Embodiments of the present invention are directed to methods, apparatuses, computer readable media and systems for securely processing remote transactions. For example, embodiments of the present invention allow consumers to use a mobile device comprising secure and sensitive payment credentials during a remote payment transaction initiated through a merchant website or merchant application. The merchant website or merchant application may utilize a secure element based mobile payment application to obtain payment credentials (e.g., account number and expiration date) instead of having the consumer provide the account number and expiry date using the keypad or obtaining the information from an unsecure memory. Embodiments provide a secure process for transferring sensitive payment information while protecting the sensitive information from untrusted, unsecure, and/or potentially malicious mobile applications (e.g., the merchant application).

Further, embodiments incorporate the generation of chip-based dynamic authentication data (e.g., dynamic cryptograms or other values) for remote transactions initiated though the mobile payment application and provide additional security over typical remote payment transactions. Accordingly, embodiments provide more secure and robust remote payment transaction systems. As such, embodiments enhance the security level of card not present transactions by providing unique dynamic and verifiable cryptograms in transactions that typically do not have the capability of including such security features.

One embodiment of the invention is directed to a method of processing a remote transaction initiated by a mobile device. The method comprising a server computer receiving a payment request including encrypted payment information. The encrypted payment information being generated by a mobile payment application of the mobile device and the encrypted payment information being encrypted using a third party key. The method further comprises decrypting the encrypted payment information using the third party key, determining a transaction processor public key associated with the payment information, and re-encrypting the payment information using the transaction processor public key. The method further comprises sending a payment response including the re-encrypted payment information to a transaction processor. The transaction processor decrypts the re-encrypted payment information using a transaction processor private key and initiates a payment transaction using the decrypted payment information.

Another embodiment of the invention is directed to a server computer comprising a processor and a computer-readable medium coupled to the processor. The computer-readable medium comprises code, executable by the processor, for performing a method of processing a remote transaction. The method comprising the server computer receiving a payment request including encrypted payment information. The encrypted payment information being generated by a mobile payment application of the mobile device and the encrypted payment information being encrypted using a third party key. The method further comprises decrypting the encrypted payment information using the third party key, determining a transaction processor public key associated with the payment information, and re-encrypting the payment information using the transaction processor public key. The method further comprises sending a payment response including the re-encrypted payment information to a transaction processor. The transaction processor decrypts the re-encrypted payment information using a transaction processor private key and initiates a payment transaction using the decrypted payment information.

These and other embodiments of the invention are described in further detail below.

DETAILED DESCRIPTION

Figure 1:
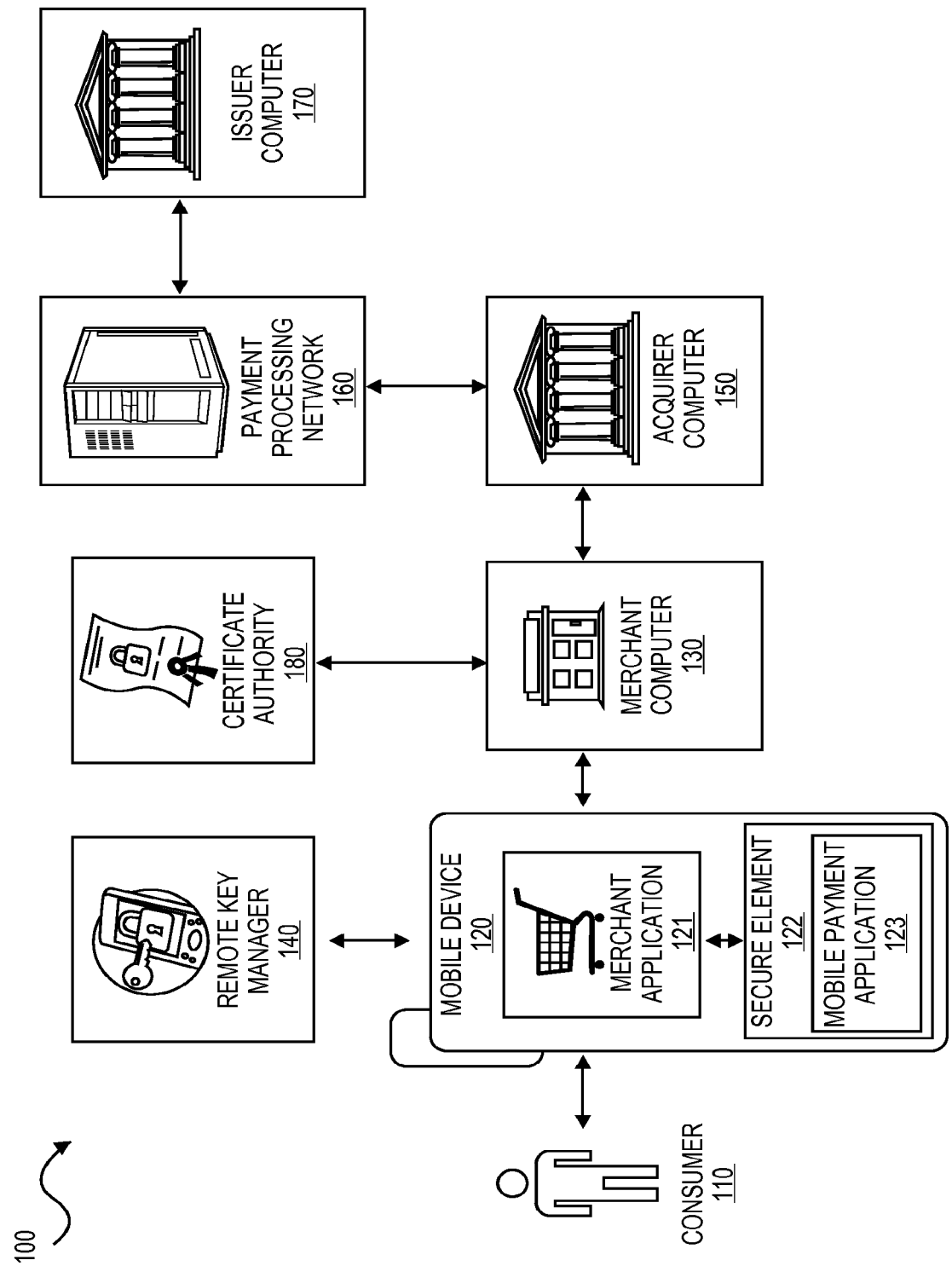
FIG. 1 shows a block diagram of an exemplary system for performing a remote transaction using a remote key manager and a merchant application of a mobile device, according to some embodiments of the invention.

Embodiments of the present invention are directed to systems and methods for securely processing remote transactions initiated by untrusted merchant applications on a mobile device. Embodiments include a number of different configurations for providing a secure system that protects sensitive payment information stored in a secure memory of the mobile device and allows for transmission of that sensitive payment information in a secure manner to perform a remote payment transaction.

When performing a remote electronic commerce (i.e., e-commerce) transaction on a mobile device, a consumer may need to provide payment credentials and other sensitive information to the merchant website so that the merchant may identify and initiate payment for the transaction. Normally a consumer may key enter or otherwise input a primary account number (PAN), expiration date, and card verification value (e.g., CVV2) into the mobile device which then sends that information to a merchant server. However, this method is not secure and may lead to fraudulent transactions. For example, there is no way for a merchant to know if the consumer is who they present themselves to be or if the consumer has possesses the underlying payment device or merely intercepted or maliciously obtained the PAN, expiration date, and card verification value from the device and is using it without the proper authorization.

According to embodiments of the present invention, a merchant web server computer or merchant application may securely obtain account information from a mobile payment application of a mobile device that securely stores the account information. Furthermore, because the remote transaction is being initiated through a mobile payment application on the mobile device, some embodiments may provide additional authentication data that further ensures that the account information on the mobile device is authentic and was provisioned or installed in an authorized manner. Accordingly, embodiments provide more secure remote payment transaction processing systems.

In some embodiments, the mobile payment application may obtain the account information from a secure element or secure memory of a mobile device. Additionally, because the transaction is being processed using a mobile payment application that may be configured to provide chip data (e.g., a dynamic value, cryptogram, etc.) during proximity or contactless communications, the remote transaction may include dynamic chip data (e.g., dynamic value or cryptogram) for the remote transaction. Accordingly, during an e-commerce transaction where a merchant typically would not be capable of receiving highly secure chip data (e.g., a dynamic value or cryptogram) because of the consumer key entry of account information and/or the lack of access to chip data, embodiments of the present invention provide the dynamic authentication information and other chip data for validation during transaction processing.

Embodiments allow a merchant computer to securely receive both account credentials and chip data from a mobile payment application during a remote payment transaction. Accordingly, a remote merchant server computer may receive sufficient data to build a standard "card present" chip transaction authorization request message which provides a higher level of security than a typical remote transaction.

Embodiments of the invention have several advantages. For example, embodiments improve the security of payment transactions using untrusted or unknown merchant applications on a mobile device. In some embodiments, a remote key manager, a mobile gateway, a payment processing network, a mobile wallet provider, or any other third party system may be used to validate merchant keys, decrypt payment information, and re-encrypt the payment information using a trusted merchant's public key. This prevents unscrupulous applications or devices from gaining access to the sensitive data, since the payment information is unreadable without the trusted transaction processor encryption key (e.g., merchant private key, merchant application private key, acquirer private key, etc.).

Additionally, embodiments provide more secure payment systems by allowing the use of highly secure and difficult to reproduce information during a transaction. For example, the dynamic cryptogram or dynamic value provided during the transaction allows for a higher level of trust by a merchant that the consumer in fact is authorized to perform a transaction using the account. Accordingly, fewer fraudulent transactions and charge backs will be processed by payment processing networks, issuers, and merchants.

Furthermore, embodiments are more convenient to consumers and users because the system allows for a consumer to use payment information (e.g., account information) that is already present on a mobile device to initiate and process a transaction. Previous remote transactions required a consumer to enter payment information manually or used information that was not stored in a secure memory. Accordingly, embodiments provide a more secure and convenient method for consumers to initiate transactions from a mobile device.

Further, because of the multiple key exchanges involved in the remote transaction processing, the sensitive information may always be protected when being transmitted or communicated to a destination entity. Accordingly, embodiments provide a secure communication process for transmitting sensitive information related to a remote transaction to allow for protection of sensitive information that may be static and re-used in future transactions (e.g., static account identifiers, expiration date, etc.).

Prior to discussing embodiments of the invention, description of some terms may be helpful in understanding embodiments of the invention.

A "remote transaction" may include any transaction where one party to a transaction is separated by some distance and/or by a device from another party to a transaction. For example, a remote transaction may include a "card-not present," electronic commerce, or other online transaction performed through communication between two or more devices. For instance, remote transactions may include devices that are not present in the same location or multiple devices where the two parties (e.g., a merchant and a consumer) are not using the same device to complete the transaction. Additionally, a remote transaction may include an in-store transaction that is not completed using a merchant point-of-sale device (i.e., access device) and instead is completed by a consumer using their mobile device to communicate with a remote (or local) merchant server computer configured to process the remote transactions. Traditionally, remote transactions have had a higher chance of fraud because remote transactions do not allow a payee the opportunity to identify the payer or otherwise ensure that the payment they are receiving is legitimate, as the two parties are not present in the same location during the transaction (such as in a "card present" or in-store transaction). A local, card present, face-to-face, or in-store transaction may include a transaction where two or more parties to a transaction are present in the same location, use the same transaction device, or is performed through at least one present individual or entity to authenticate the identity of a payer and/or payee.

A "payment request" may include a message comprising a request to process or initiate a payment. For example, the payment request may be sent from mobile device associated with a consumer in relation to a purchase transaction associated with goods or services provided by a merchant. The payment request may include any relevant information to the transaction including payment information (e.g., account identifiers, personal information, etc.), transaction information (e.g., merchant information, items being purchased, etc.), device information (e.g., mobile device phone number, secure element identifier, etc.), routing information (e.g., internet protocol (IP) address of a destination computer, identifier for destination computer, bank identification number (BIN), etc.), and any other relevant information to a payment transaction. For example, a payment request may include encrypted payment information for a transaction and may be sent to a third party computer that is configured to authenticate the payment request, validate a public key certificate, decrypt the encrypted payment information, extract a public key from the validated certificate, re-encrypt the decrypted payment information, and send the re-encrypted payment information to a transaction processor for initiation of a payment transaction. Accordingly, the payment request may include any information relevant to the secure process for transmitting sensitive data to a merchant server for processing a remote transaction.

As used herein, "payment information" may include any relevant information for performing a payment. For example, the payment information may include any sensitive account information and/or personal information that may be used to identify and/or authenticate a consumer account at an issuer. Further, in some embodiments, the payment information may also include merchant information, consumer information, mobile device information, routing information, or any other relevant information that may be used to administer, manage, and communicate payment transactions. As such, payment information may include both sensitive and non-sensitive information. Additionally, the payment information may include only a portion of account information, personal information, etc., that may be used to perform a transaction. For example, payment information may include the sensitive information associated with a transaction or account and may be sent along with other non-sensitive information that may not be considered payment information (e.g., transaction amount, etc.).

As used herein, "payment credentials" may include any information that allows a processor to identify, verify, and/or process a payment transaction using a consumer account. For example, a payment credential may include an account identifier (e.g., primary account number (PAN)), a token (e.g., account identifier substitute), expiration date, card verification value (e.g., CVV, CVV2, dCVV, etc.), a dynamic cryptogram or dynamic value (e.g., dynamic authentication data), personal information associated with an account (e.g., address, etc.), an account alias, or any other relevant information.

In some embodiments, the payment credentials may be stored in a secure memory of a mobile device. The secure memory of the mobile device may be configured such that the data stored in the secure memory may not be directly accessible by outside applications and a mobile payment application associated with the secure memory may be accessed to obtain the payment credentials stored on the secure memory. Accordingly, a merchant application may interface with a mobile payment application or with a remote transaction application or other remote transaction application in order to interface with the mobile payment application in order to gain access to the payment credentials stored on the secure memory. In some embodiments, a software development kit (SDK), an application programming interface (API), or other third party programming code or module may be accessed in order to request payment credentials from a mobile payment application. Further, the secure memory may be configured such that the payment credentials may be provided in an encrypted form using session derived keys (SDKs) based on a shared master derived key (MDK) associated with the issuer of the payment credentials stored on the secure memory of the mobile device. Additionally, a valid digital certificate may be present in order for an SDK or API to access the secure memory (e.g., secure element).

As used herein, "transaction information" may include any data associated with a transaction. For example, transaction information may include a transaction amount, transaction time, transaction date, merchant information (e.g., registered merchant identifier, address, merchant computer IP address, etc.), product information (e.g., serial numbers, product names or other identifiers, etc.). The transaction information may be provided to a mobile device by a merchant server computer before or after the consumer initiates a payment transaction through the merchant application. In some embodiments, the transaction information may be used to identify a specific merchant associated with a transaction using the merchant information included in the transaction information.

As used herein, "merchant Information" may include any information that is associated with a merchant, payee, service provider, producer, or other relying party in a transaction. For example, merchant information may include a merchant identifier that was determined during registration with a remote payment service, remote key manager, payment processing network, or other transaction processing entity associated with the remote transaction processing system. In some embodiments, the merchant identifier may be used to determine a registered merchant computer public key, merchant application public key, and/or acquirer public key associated with a transaction.

As used herein, "encrypted payment information" may include any payment information that has been made unintelligible to some parties to prevent unauthorized access to the payment information. For example, the encrypted payment information may not be read by a recipient without access to a shared secret or access to a designated encryption key. As such, the encrypted payment information may be made unintelligible through a process that is reversible and repeatable such that two entities can share information using a shared secret or encryption keys without unauthorized entities being able to understand or gain access to the sensitive payment information or sensitive payment credentials within the payment information (unless they gain access to the shared secret or encryption keys).

Additionally, in some embodiments, the encrypted payment information may include any combination of encrypted sensitive information and unencrypted less sensitive or non-secure information. For example, in some embodiments, encrypted payment information may include encrypted payment credentials (e.g., sensitive account identifiers and expiration date) and unencrypted transaction information (e.g., transaction amount, product identifiers, etc.). In other embodiments, the encrypted payment information may include all of the relevant transaction information encrypted. For instance, in some embodiments, the encrypted payment information may include both encrypted payment credentials and encrypted transaction information.

In some embodiments, the encrypted payment information may be generated by a mobile payment application of a mobile device such that the mobile payment application may have encryption keys (e.g., third party public keys) that are used to encrypt stored or received payment credentials and/or other payment information for a transaction. For example, a mobile payment application may store a third party public encryption key. The third party public encryption key may be paired with a third party private encryption key that may be securely stored at a remote key manager, a mobile gateway, a payment processing network, a mobile wallet provider, or any other third party configured to process a remote payment transaction. The third party private key may be used to decrypt the encrypted payment information and allow the third party to further encrypt the secure payment information with a public key for a designated transaction processor. Accordingly, the encrypted payment information may be used to allow for secure remote transaction processing. Additionally, the third party encryption key may include a symmetric encryption key and the keys are not limited to public/private key pairs.

As used herein, "decrypted payment information" may include payment information that has been converted from an unintelligible state to an understandable state. For example, decrypted payment information may include the result of applying an appropriate encryption key to encrypted payment information to obtain the original payment information. For instance, a third party private key may be applied to encrypted payment information that was encrypted with a third party public key in order to decrypt the encrypted payment information and obtain the underlying payment information. Further, where the encrypted payment information includes both encrypted and unencrypted information, the decrypted payment information may be obtained by decrypting the encrypted portions while not decrypting the unencrypted portion.

As used herein, "re-encrypted payment information" may include any payment information that has been made unintelligible to prevent unauthorized access to the payment information after being decrypted at least once. For example, the re-encrypted payment information may be encrypted or otherwise made unintelligible to an unauthorized entity using a different encryption key or encryption algorithm than the originally encrypted payment information. For example, decrypted payment information that was encrypted and decrypted using a third party public and private key (or a third party symmetric encryption key), respectively, may be re-encrypted using a transaction processor public key (e.g., a merchant public key, merchant application public key, acquirer public key, etc.) and sent to the transaction processor. As such, the same information (e.g., payment information) may be encrypted using two different keys that allow for two different entities to securely obtain the underlying information while protecting the information from any other entities.

A "payment response" may include a message comprising a response to a request to process or initiate a payment. For example, the payment response may be sent from a server computer in response to a purchase request associated with a remote transaction request associated with goods or services provided by a merchant. The payment response may include any relevant information to the transaction including payment information (e.g., account identifiers, personal information, etc.), transaction information (e.g., items being purchased, merchant information, etc.), device information (e.g., mobile device phone number, secure element identifier, etc.), routing information (e.g., internet protocol (IP) address of a destination computer, bank identification number (BIN), etc.), and any other relevant information. For example, a payment response may include re-encrypted payment information that has been encrypted with a transaction processor public key and may be sent to the transaction processor for further processing. For instance, the transaction processor may decrypt the re-encrypted payment information using a transaction processor private key and may initiate a payment transaction using the decrypted payment information. Further, in some embodiments, the payment response may include authentication response information that identifies whether a transaction, account, consumer, and/or other entity to a transaction has been authenticated.

A "mobile gateway" can be a server computer or a series of server computers that are configured to communicate with a mobile device. The mobile gateway may communicate with the mobile device using over-the-air (OTA) messages or using any other communication networks and protocols. For example, the mobile gateway may be configured to provide a secure communications channel (i.e., secure channel) with a mobile device over which information can be transmitted securely to and from the mobile device using a mobile communications network, the Internet, and/or any other relevant communications network.

A "transaction processor" may include any entity that is associated with processing a transaction. For example, a merchant, a mobile device, a merchant application or other mobile application on a mobile device (e.g., an acquirer application or payment service provider application), an acquirer computer, a payment processing network, and any other entity in a transaction processing eco-system may be a transaction processor. In some embodiments, a transaction processor may be associated with a particular public key (e.g., merchant public key, merchant application public key, acquirer public key, etc.) and private key (e.g., merchant private key, merchant application private key, acquirer private key, etc.) that may be used to encrypt and decrypt payment information during processing of a remote payment transaction.

As such, in some embodiments, the transaction processor may be the entity that is configured to decrypt the encrypted (or re-encrypted) payment information and initiate a payment transaction. A payment transaction may be initiated through any suitable manner including passing the decrypted payment information to another party or by generating and/or mapping decrypted payment information to an authorization request message. For example, in some embodiments, the transaction processor may initiate a payment transaction by mapping the decrypted payment information to an authorization request message configured to be processed by a payment processing network.

A "dynamic value" may include any data that changes. For example, the dynamic value may change over time (e.g., periodically), use (e.g., per transaction), and/or change based on received information (e.g., input information to an algorithm). For instance, a dynamic value may include an authentication value (or authentication request value) that may change every time a transaction is initiated and may be generated using a shared secret algorithm or other shared information between two entities such that one entity may validate that the other entity has access to the shared secret and is thus, authentic. This may also be referred to as authentication data. In some embodiments, a dynamic value may include a cryptogram that is generated using a shared secret algorithm between two entities. For example, the cryptogram may be generated per transaction based on a derived algorithm that is specific to each consumer device and/or issuer account and may be validated at a payment processor or an issuer of the account for each transaction. Such dynamic values may be referred to as dynamic card verification values (e.g., dCVV, dCVV2), unique authentication verification values (UAVV), token authentication verification value (TAVV), etc., and may be distinguished based on the input data and the algorithm used to generate the verifiable dynamic values. For example, a token authentication verification value may use a token as an input to a verification algorithm while a dynamic card verification value may use a primary account number as an input to generate the dCVV.

In other embodiments, a dynamic value may include a cryptogram that is generated using a secret algorithm that is only known by a single entity. For example, in some embodiments, a payment processing network may generate an authentication response value using a secret algorithm for a transaction before a payment is initiated or an authorization request message is generated. When the transaction is initiated and the authorization request message is generated, the authentication response message may be included in the authorization request message and the payment processing network may validate the authentication response value using the same secret algorithm and input data to ensure the transaction data has not changed and the transaction information matches. Accordingly, dynamic values may include cryptograms generated using shared keys (e.g., dynamic verification values, token authentication data, etc.) or secret keys (e.g., authentication response values).

In some embodiments, the payment processing network may authenticate the transaction value before receiving an authorization request message and the payment processing network may return an authentication response including an authentication response value indicating validation of the dynamic value if the dynamic value is authenticated and/or validated. Accordingly, the third party remote transaction processor (e.g., payment processing network computer) may substitute the dynamic value with the authentication response value in the payment information before re-encrypting the payment information and sending to the transaction processor for initiation of the payment transaction. Thereafter, the authentication response value may be returned to the payment processing network in order to inform the transaction entity that the payment transaction was previously authenticated. Such systems increase the security of transaction processing systems and minimize the chances that the transaction is fraudulent since multiple authentication processes occur at various times during the transaction processing. Additionally, authentication information may be provided to merchants An "authentication response value" may include any data that informs an entity that data or a process has been authenticated. For example, an authentication response value may be generated similarly to the dynamic value above but may be generated using a different shared secret or algorithm such that another entity within the transaction processing eco-system that has access to the shared secret may determine that the message, account, or other information included in the message has been authenticated by an entity. For instance, particular static data elements (e.g., account identifier, expiration date, transaction time, date, etc.) associated with a transaction may be used to generate the authentication response value during the authentication phase and the calculation may be repeated (using the same data elements) during the payment phase after receiving the authorization request message, to validate that the authentication response value.

A "mobile payment application" may include any application configured to facilitate a payment transaction from a mobile device or other electronic device. For example, a mobile payment application may store sensitive payment information and/or payment credentials for a consumer account in a secure manner such that the payment information, account information, payment credentials, personal information, or any other relevant information may be protected from unauthorized access. The mobile payment application may be configured to provide the sensitive information to an authorized software application or module on a mobile device, a contactless element, or any other software or hardware configured and authorized to communicate with the mobile payment application. For example, a mobile payment application may be configured to interface with other mobile applications or merchant applications on a mobile device in order to provide payment information for a transaction. For instance, the mobile payment application may provide a software development kit (SDK) or application programming interface (API) that merchant applications and/or other mobile applications may use to interface with the mobile payment application. The mobile payment application may be configured to provide the sensitive information in encrypted form using stored keys on a secure memory.

Further, in some embodiments, the mobile payment application may comprise any API, service, application, applet, or other executable code suitable to retrieve payment information from a secure element, generate payment information (e.g., a dynamic value using an unpredictable number, etc.) for a transaction, and communicate with a remote transaction application, merchant application, mobile gateway, and/or any other application in order to securely communicate with a server computer (e.g., remote key manager, mobile gateway, payment processing network, third party service provider, etc.). The mobile payment application may include or be configured to obtain stored information including a payment processing network public key, payment credentials, third party keys, mobile gateway credentials, and may be capable of communicating with a mobile gateway to obtain issuer updates. For example, the mobile payment application may include a certificate associated with mobile gateway, which may be used to encrypt payment information using a public key associated with the mobile gateway.

A "merchant application" may include any application associated with a party to a transaction. For example, a merchant application may be associated with a particular merchant or may be associated with a number of different merchants and may be capable of identifying a particular merchant (or multiple merchants) which are parties to a transaction. For instance, the merchant application may store information identifying a particular merchant server computer that is configured to provide a sales environment in which the merchant server computer is capable of processing remote transactions initiated by the merchant application. Further, the merchant application may also include a general purpose browser or other software designed to interact with multiple merchant server computers as long as the browser is configured to identify the merchant server computer and process a remote transaction. The merchant application may be installed on general purpose memory of a mobile device and thus, may be susceptible to malicious attacks, cracks, etc. Accordingly, the merchant application may be treated as an untrusted or unknown application by secure systems within the mobile device and remote payment transaction processing system.

In some embodiments, a merchant application may initiate a payment transaction by sending decrypted payment information to a merchant server computer and the merchant server computer may then generate an authorization request message for the payment transaction using the decrypted payment information. In other embodiments, the merchant application may be configured to generate an authorization request message and send the authorization request message to a merchant server for processing.

Additionally, in some embodiments, a merchant application may be operated by or associated with an acquirer, payment service provider, or back-end processor that is operating on behalf of one or more merchants and/or processing one or more merchants' remote transactions. For example, the merchant application may include a payment service provider that is configured to process remote transactions on behalf of a merchant computer. Additionally, an acquirer may process transactions on behalf of merchant computers and may provide an acquirer application that performs similar functionality to the merchant application by allowing consumers to initiate remote payments through the acquirer application.

A "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a certification authority (i.e., certificate authority) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss.

A "public key" may include any encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair.

A "digital signature" may refer to the result of applying an algorithm which allows a signing party to manifest, and a verifying party to verify, the authenticity and integrity of a document. For example, for a public/private key pair, the signing party may act by means of the private key and the verifying party may act by means of the public key. This process may certify the authenticity of the sender and the integrity of the signed document because of the so-called principle of nonrepudiation which does not allow disowning what has been signed. A certificate or other data that includes a digital signature by a signing party is said to be "signed" by the signing party.

A "certificate" may include an electronic document or data file that establishes the identity and/or authenticity of an entity. For example, a certificate may use a digital signature to bind a public key with data associated with an identity. The certificate may include one or more data fields, such as the legal name of the identity, a serial number of the certificate, a valid-from and valid-to date for the certificate, certificate-related permissions, or any other relevant information to identify and/or authenticate an entity or the certificate itself. For instance, a certificate may contain a "valid-from" date indicating the first date the certificate is valid, and a "valid-to" date indicating the last date the certificate is valid. Further, a certificate may also contain a hash of the data in the certificate including the data fields. Additionally, each certificate may be signed by a certificate authority.

A "certificate authority" may include any entity configured to issue certificates. The certificate authority may prove its identity using a certificate authority certificate, which includes the certificate authority's public key. The certificate authority certificate may be signed by another certificate authority's private key, or may be signed by the same certificate authority's private key. The latter is known as a self-signed certificate. The certificate authority also typically maintains a database of all certificates issued by the certificate authority.

In a typical certificate issuing process, the certificate authority receives an unsigned certificate from an entity whose identity is known. The unsigned certificate includes a public key, one or more data fields, and a hash of the data in the certificate. The certificate authority may sign the certificate with a private key corresponding to the public key included on the certificate authority certificate. The certificate authority may then store the signed certificate in a database, and issue the signed certificate to the entity. Thereafter, the entity may use the certificate as a means for presenting the authenticity and identity of the entity.

In some embodiments, a certificate authority may include any of the entities from the transaction processing ecosystem. For example, a payment processing network, remote key manager, issuer, acquirer, or any other entity within the transaction system may also be responsible for issuing and certifying certificates. For instance, a merchant, merchant application, or acquirer computer that is configured to process remote transactions may be register with a remote key manager, payment processing network, mobile wallet provider, or any other third party in order to obtain a public key certificate signed by the respective entity that allows the entity to validate the certificate and ensure the certificate is valid for any given transaction. In some embodiments, an entity within the remote payment transaction processing system may contact a certificate authority to determine whether the status of a certificate has been updated, is in good standing, has been revoked, etc. Accordingly, the certificate authority may be configured to provide status information regarding issued certificates.

A "token" may include any data substitute. For example, the token may include a substitute for an account identifier at an issuer, payment processing network, merchant, or any other transaction entity. The token may identify a payment account or a non-payment account where the relationship between the account and the token is managed by a token registry 1061 or database.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 10:
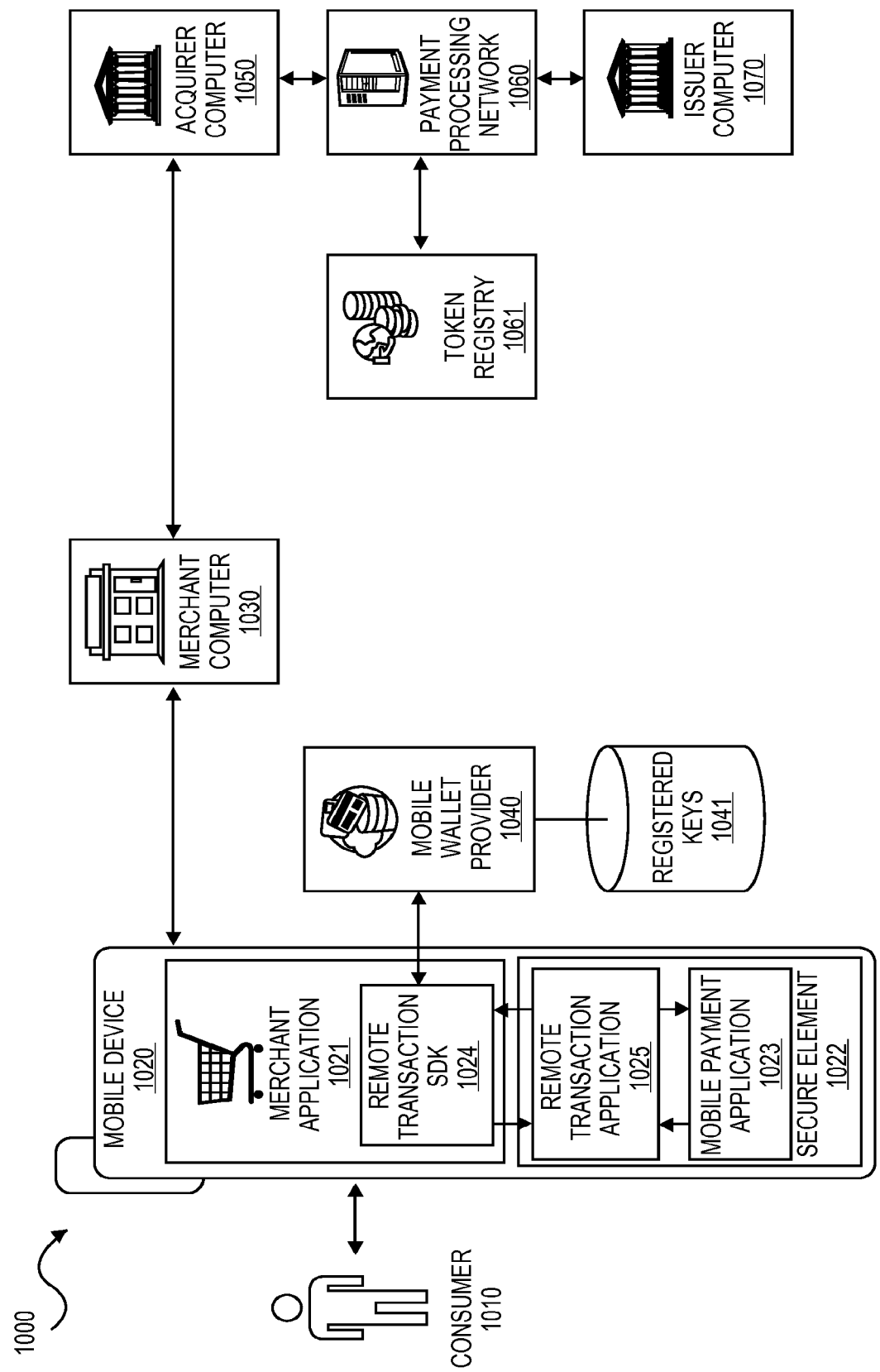
FIG. 10 shows a block diagram of an exemplary system for performing a remote transaction using a third party service provider (e.g., mobile wallet provider) and a merchant application of a mobile device, according to some embodiments of the invention.

Embodiments of the present invention described herein include multiple different embodiments that may be combined in any suitable manner, as one of ordinary skill in the art would recognize. For example, in the various embodiments described below, various different parties, merchant applications, mobile payment applications, and transaction processors are described and specific flow diagrams are provided as examples. These examples are provided for illustration of the concepts of the present invention and are meant to be non-limiting. Accordingly, features from the various embodiments may be combined in any suitable manner including using registered public keys and public key certificates in different configurations than are provided explicitly in each illustrative system described herein. For example, public key certificate processes (as described in relation to FIGS. 1 and 5-6) may be used with third party service providers (as shown in the system of FIG. 10) and registered key processes (as described in relation to FIG. 10) may be used with the remote key manager (as described in relation to FIGS. 1 and 5-6). Accordingly, this is just one example of the various combinations that could be provided according to some embodiments of the present invention which may be described in more detail below.

I. Systems and Methods for Processing Remote Mobile Payment Transactions Using a Remote Key Manager FIG. 1 shows a block diagram of an exemplary system 100 for performing a remote transaction using a remote key manager 140 and a merchant application 121 of a mobile device 120, according to some embodiments of the invention. The system 100 comprises a user (e.g., consumer 110), a mobile device 120 including a merchant application 121, a secure element 122, and a mobile payment application 123, a remote key manager 140, a certificate authority 180, a merchant computer 130, an acquirer computer 150, a payment processing network 160, and an issuer computer 170. The various entities may be configured to communicate with one another over any suitable wireless or wired communication network and using any suitable communications protocol, including open or proprietary communications protocols.

As used herein, an "issuer" may typically refer to a business entity (e.g., a bank) that maintains financial accounts for a user and often issues a portable consumer device such as a credit or debit card to the user. The issuer may also issue or provisioning account information to a mobile device 120 to allow for mobile payments initiated by a mobile device. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 130, acquirer computer 150, payment processing network 160, and issuer computer 170) to enable communications, or to perform one or more of the functions described herein.

The payment processing network 160 may include data processing subsystems, networks, and operations used to support and deliver certificate authority services, authorization services, exception file services, transaction scoring services, and clearing and settlement services. An exemplary payment processing network 160 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 160 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 160 may use any suitable wired or wireless network, including the Internet.

In some card present or in store payment transactions, the user purchases a good or service at a merchant using a mobile device 120. For example, the user's mobile device 120 can interact with an access device (not shown) at a merchant associated with merchant computer 130. For example, the user may tap the mobile device 120 against an near-field communication (NFC) reader in the access device. Alternately, in a remote or "card not present" transaction, the user may indicate payment details to a merchant computer 130 electronically, such as in an online transaction.

An authorization request message may be generated by mobile device 120 or merchant computer 130 and then forwarded to the acquirer computer 150. After receiving the authorization request message, the authorization request message is then sent to the payment processing network 160. The payment processing network 160 then forwards the authorization request message to the corresponding issuer computer 170 associated with an issuer associated with the user.

An "authorization request message" may be an electronic message that is sent to a payment processing network 160 and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 170 receives the authorization request message, the issuer computer 170 sends an authorization response message back to the payment processing network 160 to indicate whether the current transaction is authorized (or not authorized). The payment processing network 160 then forwards the authorization response message back to the acquirer computer 150. In some embodiments, payment processing network 160 may decline the transaction even if issuer computer 170 has authorized the transaction, for example depending on a value of the fraud risk score. The acquirer computer 150 then sends the response message back to the merchant computer 130.

An "authorization response message" may be an electronic message reply to an authorization request message generated by an issuing financial institution 170 or a payment processing network 160. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 160) to the merchant computer 130 that indicates approval of the transaction. The code may serve as proof of authorization. As noted above, in some embodiments, a payment processing network 160 may generate or forward the authorization response message to the merchant.

After the merchant computer 130 receives the authorization response message, the merchant computer 130 may then provide the authorization response message to the user. The response message may be displayed by the mobile device 120 or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 160. A clearing process is a process of exchanging financial details between an acquirer and an issuer to facilitate posting to a customer's payment account and reconciliation of the user's settlement position.

In the remote transaction processing system of FIG. 1, the mobile device 120 is configured to initiate and process a remote transaction with a merchant computer 130 using a remote key manager 140 to provide a secure remote payment transaction environment, even when using an unknown merchant application 121 or other mobile application is installed on a mobile device 120.

A user (e.g., consumer 110) may operate a mobile device 120 to perform any number of functions that the mobile device 120 is configured to perform. For example, the consumer 110 may use mobile device 120 to conduct remote payment transactions by communicating with a remote key manager 140 and a merchant computer 130. The merchant computer 130 may deliver available products and services to the merchant application 121 which the consumer 110 may use to initiate a remote transaction, whether located at a merchant location or remote from the merchant.

The mobile device 120 may be configured to communicate with a remote key manager 140 that is configured to facilitate and/or process the remote transaction. The remote key manager 140 is configured to perform a number of functions related to a remote transaction including receiving encrypted payment information, validate a public key certificate associated with the remote transaction, decrypt the encrypted payment information using a remote key manager key, and re-encrypt the payment information using a public key associated with a transaction processor (e.g., merchant, merchant processor, acquirer, etc.) for the transaction. The various modules of the remote key manager 140 are described in further detail in FIG. 3.

A "mobile device" may include any electronic computing device. For example, a mobile device 120 may include a mobile phone, tablet, netbook, laptop, or any other suitable mobile computing device. The mobile device 120 may comprise a merchant application 121 and a mobile payment application 123. The mobile payment application 123 may be stored in a secure memory (e.g., secure element 122).

Merchant application 121 may include any mobile program, software, or other suitable executable code suitable to conduct a payment transaction. In some embodiments, merchant application 121 may be a merchant-specific application. In other embodiments, merchant application 121 may be a general purpose application, such as a web browser. Further, merchant application may be associated with parties that are not merchants and instead process payments on behalf of merchants or other service providers (e.g., payment service providers, acquirers, etc.).

Secure element 122 may be any hardware or software component operable to securely store any information and/or secure applications. For example, the secure element 122 may be operable to store payment information. Further, a mobile payment application 123 may be provisioned and stored on the secure element 122 to securely access personalized sensitive information (e.g., payment credentials, tokens, account identifiers, etc.) associated with a consumer's financial account. For instance, in some embodiments, secure element 122 may include a secure crypto-processor or a contactless integrated circuit to protect information stored on the secure element 122. The secure element 122 may have a separate processor, information stored thereon may be encrypted with secret keys only held by trusted service managers or other designated entities, and the secure element 122 may contain any other hardware such that the secure element 122 may be a secure area where important information (e.g., payment credentials, encryption keys, and any other sensitive information) may be stored. Further, the secure data elements of the secure element 122 may only be accessed using the special secret keys that only certain trusted service managers may have access to.

Mobile payment application 123 may include any application programming interface (API), service, application, applet, or other executable code suitable to retrieve payment information from a secure storage module or secure element 122 and communicate with a merchant application 121. In some embodiments, mobile payment application 123 may be secured. For example, mobile payment application 123 may run in the secure element 122 (as shown in FIG. 2) or other trusted environment, as a kernel service, or at a higher permission level than merchant application 121.

Mobile payment application 123 may include a certificate associated with the remote key manager 140, which may be used to encrypt payment information and other communications using a public key associated with remote key manager 140. In some embodiments, mobile payment application 123 may be operable to generate cryptograms associated with the payment information. For example, mobile payment application 123 may be operable to a generate dynamic card verification value (dCVV2) associated with a payment account. In other embodiments, the mobile payment application may be capable of generating specific dynamic authentication requests or other dynamic values that may be validated by a payment processing network sharing a secret with the personalized mobile payment application.

Figure 2:
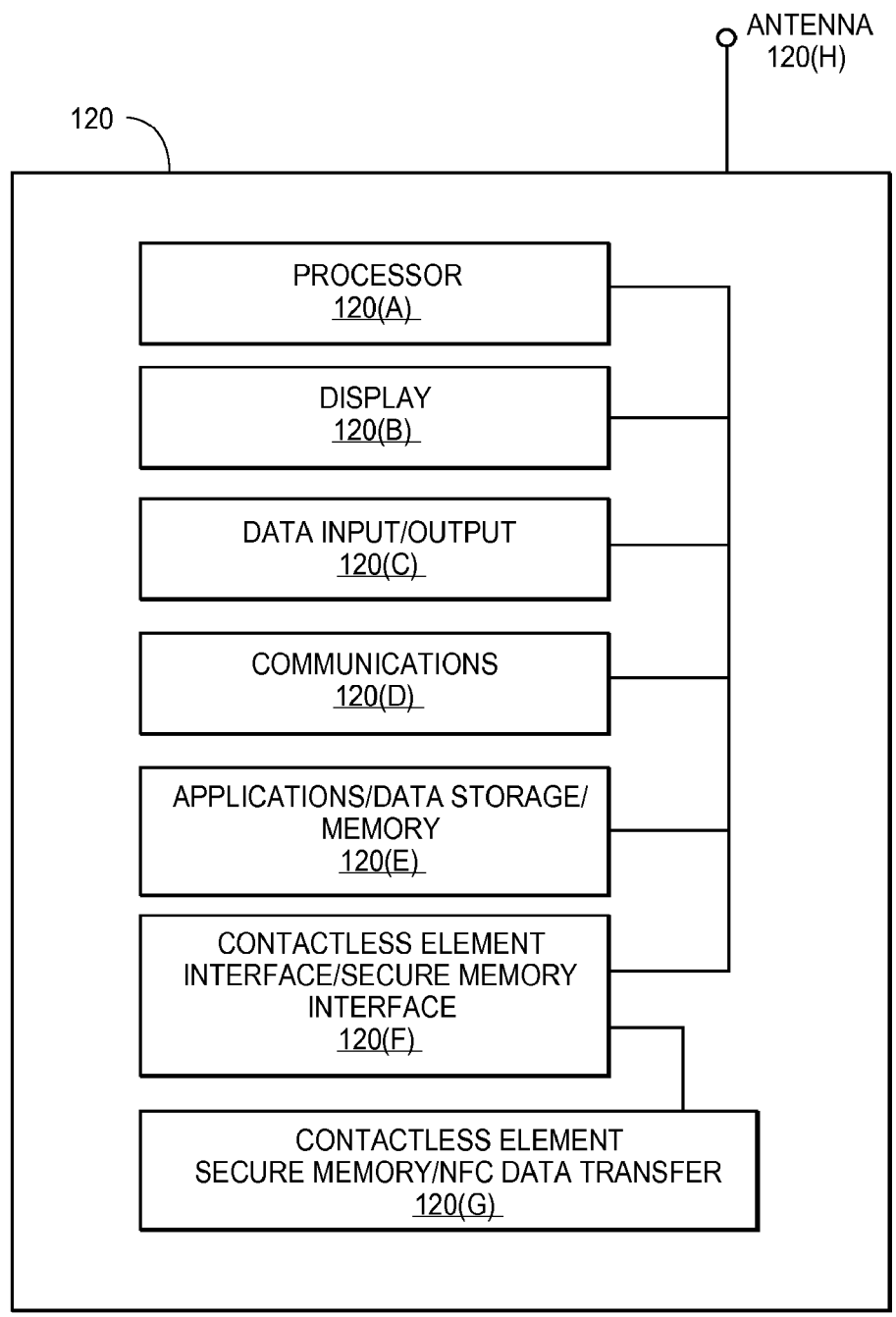
FIG. 2 shows a block diagram of an exemplary mobile device that may be used with some embodiments of the invention.

FIG. 2 shows a block diagram of an exemplary mobile device 120, according to some embodiments of the invention. Mobile device 120 may include circuitry that is used to enable certain device functions, such as telephony. The functional elements responsible for enabling those functions may include a processor 120(A) that is programmed to execute instructions that implement the functions and operations of the device. Processor 120(A) may access data storage 120(E) (or another suitable memory region or element) to retrieve instructions or data used in executing the instructions, such as merchant applications, remote transaction application, or other mobile applications. Data input/output elements 120(C), such as a keyboard or touchscreen, may be used to enable a user to operate the mobile device 120 and input data (e.g., user authentication data). Data input/output elements may also be configured to output data (via a speaker, for example). Display 120(B) may also be used to output data to a user. Communications element 120(D) may be used to enable data transfer between mobile device 120 and a wired or wireless network (via antenna 120(H), for example) to assist in connectivity to the Internet or other communications network, and enabling data transfer functions.

Mobile device 120 may also include contactless element interface or secure memory interface 120(F) to enable data transfer between contactless element 120(G) and other elements of the device, where contactless element 120(G) may include a secure memory (e.g., a secure element 122) and a near field communications data transfer element (or another form of short range or contactless communications technology). As noted, a cellular phone or similar device is an example of a mobile device 120 that may be used in accordance with embodiments of the present invention. However, other forms or types of devices may be used without departing from the underlying concepts of the invention. Further, devices may not require the capability to communicate using a cellular network in order to be suitable for use with embodiments of the present invention.

Figure 3:
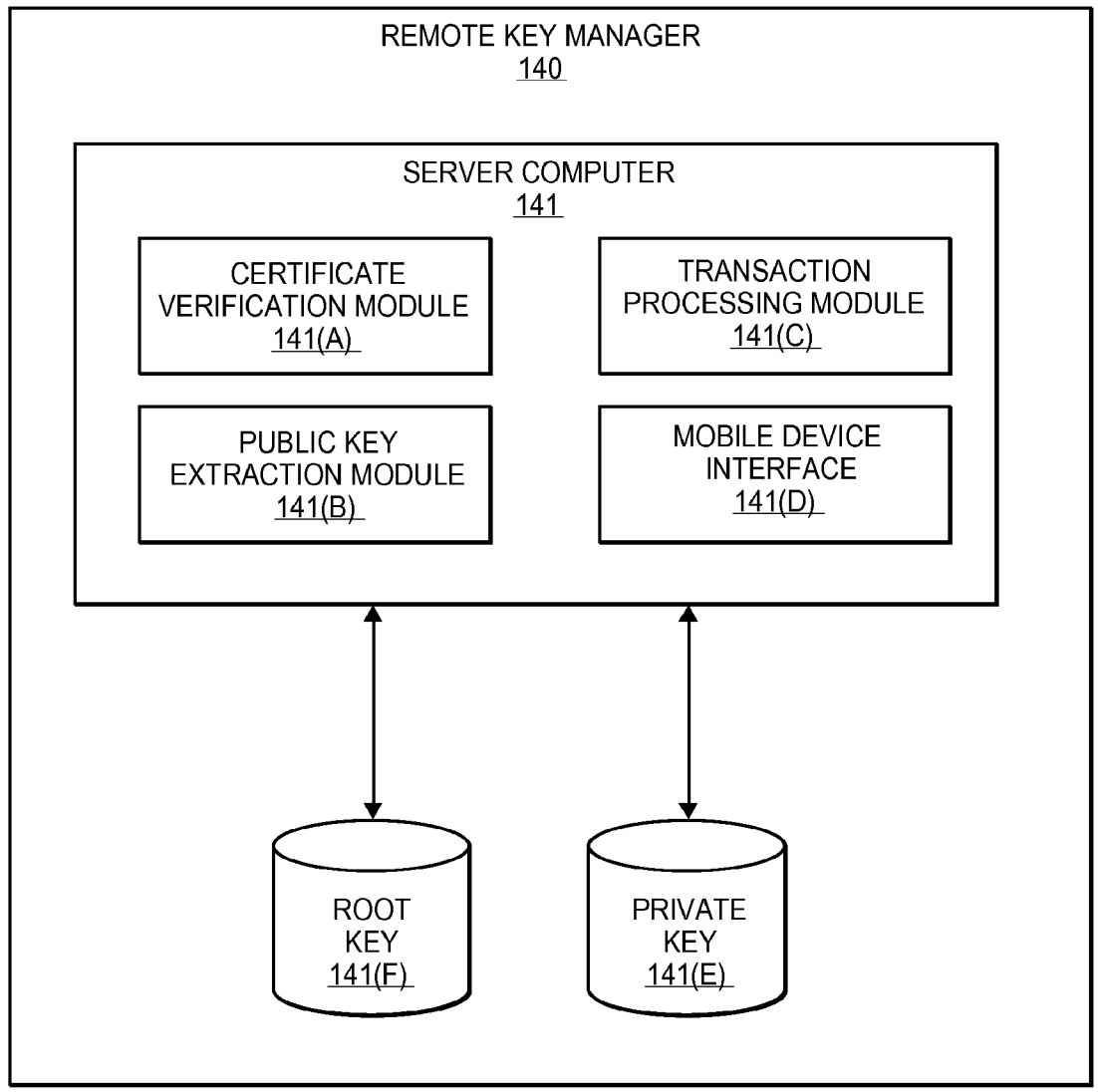
FIG. 3 shows a block diagram of an exemplary remote key manager, according to some embodiments of the invention.

FIG. 3 shows a block diagram of an exemplary remote key manager 140, according to some embodiments of the invention. The remote key manager 140 may comprise a server computer 141, a certificate authority root public key database 141(F), and a private key database 141(E). The server computer 141 may comprise a certificate verification module 141(A), a public key extraction module 141(B), a transaction processing module 141(C), and a mobile device interface 141(D). The server computer 141 may further comprise a processor (not shown) and a computer-readable medium (not shown) coupled to the processor, the computer-readable medium comprising code, executable by the processor, for performing a method as described in embodiments herein.

The certificate verification module 141(A) may be configured to verify a merchant certificate (or other transaction processor certificate) as being associated with a particular merchant, being authenticate, and being valid. The certificate verification module 141(A) may perform any number of steps in order to accomplish this functionality. For example, the certificate verification module 141(A) may communicate with a certificate authority 180 to ensure that the public certificate is currently valid and in good standing (e.g., has not been reported, via certificate revocation lists (CRLs) or online certificate status protocol responders (CSPRs) or the like, as compromised or revoked). Additionally, the certificate verification module 141(A) may use a certificate authority root public key stored in a root key database 141(F) to validate that the public key certificate is legitimate and signed by an appropriate certificate authority 180.

Returning to FIG. 1, the certificate authority 180 may be associated with the merchant server computer and may issue a public key certificate to the merchant computer 130 that may be used during remote payment transaction processing to establish trust between the third party server computer (e.g., remote key manager 140) and the merchant server computer, that the merchant computer 130 is authentic and is authorized to obtain the sensitive payment credentials in the encrypted payment information. The process by which the certificate authority 180 may issue a merchant certificate is described in more detail in FIG. 4 below. Some non-limiting examples of certificate issuing methods may be found in ANSI X9.24 Part 2 *Retail Financial Services Symmetric Key Management Part 2: Using Asymmetric Techniques for the Distribution of Symmetric Keys* and ISO 11568 Part 4 *Banking—Key management (retail)—Part 4: Asymmetric cryptosystems—Key management and life cycle*.

The public key extraction module 141(B) may be configured to extract a public key from a received or stored public key certificate for use in processing the remote transaction. The public key may be extracted using any suitable processes. In some embodiments, the public key may be extracted before or after validation and/or verification of the public key certificate.

The transaction processing module 141(C) may be configured to process a payment request and provide a payment response in return to the payment request, assuming a received or stored public key certificate is valid and active for the transaction. For example, the transaction processing module 141(C) may decrypt received encrypted messages using a remote key manager private key stored in a private key database 141(E) and use the extracted transaction processor public key from the transaction processor certificate (e.g., merchant certificate) to re-encrypt the decrypted message or information from the message for secure delivery to the transaction processor. The transaction processing module 141(C) may further communicate the re-encrypted message (e.g., payment response) to the mobile device interface 141(D) for delivery to the appropriate transaction processor.

The mobile device interface 141(D) may be configured communicate with a mobile device 120. For example, the mobile device 120 may incorporate any suitable communication protocols or network interfaces in order to communicate with a mobile device 120. The mobile device interface 141(D) may receive a message (e.g., a payment request) from a mobile device 120 and may be configured to parse the message to determine relevant information included in the message.

The private key database 141(E) may comprise a private key for the remote key manager 140 (also referred to as a remote key manager private key). The private key may be generated through any suitable manner and may be stored securely such that unauthorized entities are not provided access to the private key. In some embodiments, the private key may be stored in a local memory or in a remote secured database. In some embodiments, the private key may be one of a private/public key pair associated with the remote key manager 140 and the public key may be provided to merchant applications 121, mobile payment applications 123, mobile devices 120, remote transaction applications (not shown), and any other transaction entities that are configured to encrypt payment information for processing by the remote key manager 140. Additionally, in some embodiments, the private key database 141(E) may include a symmetric encryption key that may be used where data is encrypted using a symmetric encryption key instead of public/private encryption key pair.

The root public key database 141(F) may comprise a root public key for the certificate authority associated with a public key certificate. In some embodiments, a single certificate authority root public key may be stored at the remote key manager associated with a single certificate authority (and may be stored locally at the remote key manager computer) while in other embodiments, multiple certificate authority root keys may be stored in a database or locally at the remote key manager computer. The certificate authority root public key may be used in a signature validation process to ensure the public key certificate is valid and active with an issuing certificate authority.

A. Merchant Certificate Issuance/Provisioning Methods

Figure 4:
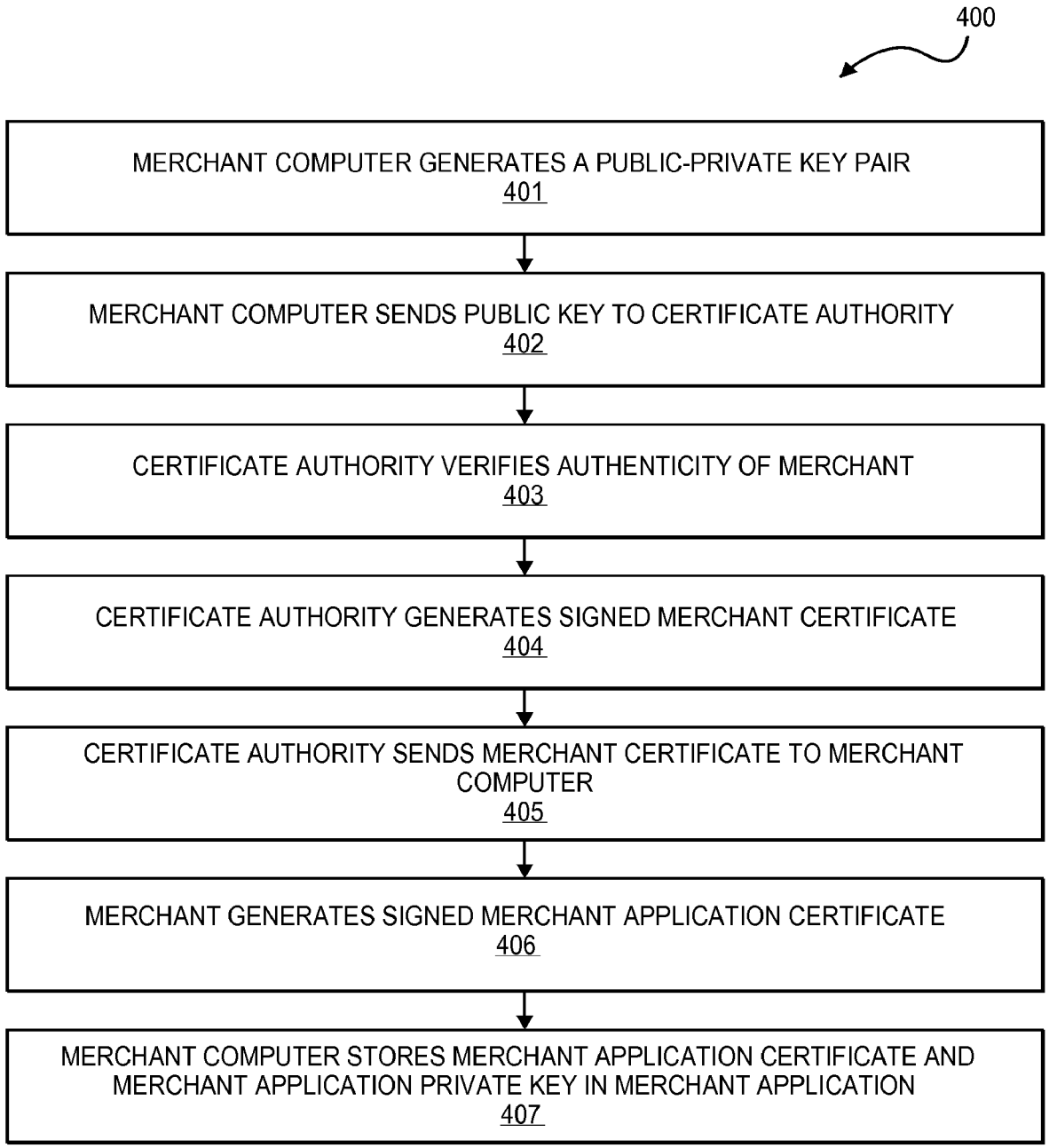
FIG. 4 shows a flow diagram of an exemplary method for provisioning merchant public/private key pairs and merchant application certificates using a certificate authority, according to some embodiments of the invention.

FIG. 4 shows a flow diagram of an exemplary method 400 for provisioning merchant public/private key pairs and merchant application certificates using a certificate authority 180, according to some embodiments of the invention. In some embodiments, method 400 may be performed in order to provide a merchant computer 130 with a certificate indicating the merchant's trustworthiness or authenticity. Subsequently, the received merchant certificate may be included in merchant applications installed on or provided to mobile devices.

At step 401, a merchant computer 130 generates a merchant public-private key pair. The merchant public-private key pair may be generated in any suitable format such as RSA or elliptical curve cryptography (ECC). In some embodiments, a merchant private key may be stored securely on a merchant computer 130.

At step 402, merchant computer 130 sends the merchant public key of the public-private key pair to a certificate authority 180. The certificate authority 180 may include any suitable entity configured to issue and validate a certificate. For example, in some embodiments, the certificate authority 180 may include a payment processing network 160, a remote key manager 140, a mobile wallet provider, an entity that is not included in the typical payment transaction processing system, or any other entity.

At step 403, the certificate authority 180 verifies the authenticity of the merchant using any suitable means. For example, merchant computer 130 may provide the certificate authority 180 with information providing the identity of the merchant computer 130 as being operated by the merchant. In one example, merchant computer 130 may provide a document signed by an authorized signatory of a merchant (e.g., the merchant organization's president).

At step 404, certificate authority 180 generates a signed merchant certificate using the received merchant certificate signing request which includes the merchant public key. Typically, the merchant certificate may be signed by the certificate authority root private key. The certificate authority signature allows an entity to validate the authenticity of the merchant certificate using a certificate authority root public key.

At step 405, certificate authority 180 sends the signed merchant certificate to merchant computer 130.

At step 406, merchant computer 130 generates a signed merchant application certificate using the merchant private key. Thus, a chain of trust may be established from the merchant application certificate, to the merchant certificate, to the certificate authority root certificate. In some embodiments, the signed merchant application certificate may be associated with an instance or version of a merchant application 121. For example, the merchant application certificate may be used to verify that the merchant application 121 is from the merchant.

At step 407, merchant computer 130 stores the merchant application certificate and a merchant application private key associated with the merchant application certificate in a merchant application 121. Thus, when the merchant application 121 is loaded onto a mobile device 120, the authenticity of the merchant application 121 may be verified.

It should be understood that FIG. 4 is intended to be descriptive and non-limiting. For example, in some embodiments of the invention, the merchant public-private key pair may be generated by the certificate authority 180, and the merchant private key may be provided to the merchant computer 130 securely, for example using a Public-Key Cryptography Standards (PKCS) #12 message.

Figure 5:
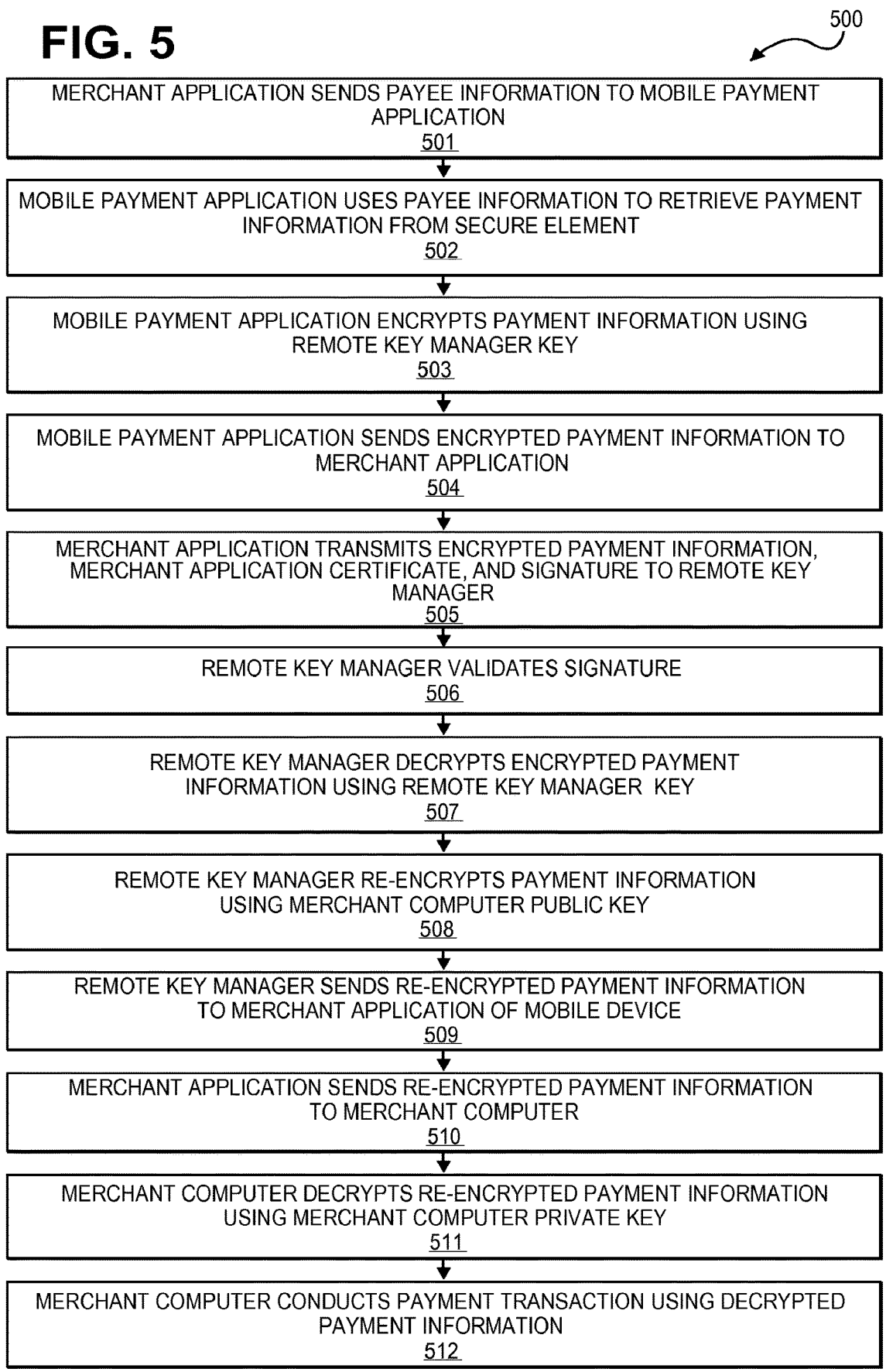
FIG. 5 shows a flow diagram of an exemplary method for processing a remote transaction using a remote key manager and a merchant application of a mobile device, according to some embodiments of the invention.

B. Exemplary Merchant Application Remote Payment Methods Using Remote Key Manager and Public Key Certificates FIG. 5 shows a flow diagram of an exemplary method 500 for processing a remote transaction using a remote key manager 140 and a merchant application 121 of a mobile device 120, according to some embodiments of the invention. In some embodiments, the method of FIG. 5 may be performed after a merchant application certificate has been provisioned (e.g., in accordance with method 400) and stored in the merchant application 121 with or without the merchant application private key. Subsequently, the method of FIG. 5 may be performed in order to conduct a remote payment transaction for goods or services.

At step 501, merchant application 121 sends payee information to the mobile payment application 123 for performing a remote payment transaction. Payee information may include information suitable to identify a user payment method (e.g., payment credentials associated with the mobile payment application 123), a merchant associated with the mobile payment application 123 (and the remote payment transaction), a type of transaction (e.g., a remote transaction), and any other information that may be relevant to the mobile payment application 123 for processing the remote payment transaction. For example, payee information may include a user's name, a payment processing network identifier associated with the payment method (e.g., Visa™, MasterCard™, etc.), and the last four digits an account number in order for the mobile payment application 123 to identify payment credentials or account information in which to use for the remote payment transaction.

Further, the payee information may include a merchant identifier that was provided to the merchant application 121 (or a merchant server associated with the merchant application 121) during a registration phase for the remote transaction processing service or the remote key manager 140. In some embodiments, the payee information may be used to identify a merchant certificate in which to provide to the remote key manager 140 (e.g., for embodiments where the mobile payment application 123 passes the merchant certificate to the remote key manager 140).

Additionally, the payee information may include a type of transaction identifier informing the mobile payment application 123 that the request is associated with a remote payment transaction. Accordingly, the mobile payment application 123 may select the appropriate public encryption key in which to encrypt the payment information (e.g., remote key manager public key), the appropriate destination or routing address for the remote key manager 140, and the correct communication protocol or message format for communicating with the remote key manager 140.

At step 502, mobile payment application 123 uses the received payee information to retrieve and/or generate payment information from the secure element 122 of the mobile device 120. "Payment information" may include payment card data (e.g., a payment account number (PAN) and expiration date), a cryptogram (such as a dynamic card verification value (dCVV or dCVV2) or other dynamically generated data), or any other information suitable to conduct a remote payment transaction.

At step 503, mobile payment application 123 encrypts the payment information using a remote key manager key. The remote key manager key may be either symmetric or a public key associated with a remote key manager public/private key pair. In some embodiments, mobile payment application 123 may determine the remote key manager public key using a remote key manager certificate stored on mobile device 120, may request a certificate from the mobile key manager, or may obtain the remote key manager public key on the secure element 122 or general memory of the mobile device 120. Where the remote key manager key is a symmetric key, the symmetric key may be stored securely with the mobile payment application 123.

At step 504, mobile payment application 123 sends the encrypted payment information to merchant application 121. It should be noted that because the remote key manager private key is not known by merchant application 121, the encrypted payment information cannot be deciphered by the merchant application 121.

At step 505, merchant application 121 receives the encrypted payment information and generates a payment request including the encrypted payment information, the received encrypted payment information, any other transaction data (e.g., transaction amount, merchant identifier, product identifiers, etc.) associated with the payment transaction that was not included in the encrypted payment information, a merchant certificate associated with the merchant computer 130, and a signature generated using the merchant computer private key. The merchant application 121 may then transmit the payment request to the remote key manager 140. In some embodiments, the payment request may be encrypted using a session key established between the remote key manager 140 and the mobile device 120. The session key may be established and communicated through any suitable manner.

At step 506, the remote key manager 140 receives the payment request, may decrypt the payment request using the session key, and parses the encrypted payment information, non-encrypted transaction data, the merchant certificate, and the signature from the payment request. The remote key manager 140 may validate the signature. Typically, the signature may be validated using the public key included in the merchant certificate. Alternatively, in some embodiments, the public key may be registered and stored at the remote key manager as being associated with the merchant certificate. If the signature is not validated, then the remote key manager 140 indicates to the merchant application 121 that the signature is invalid, and the method halts. Otherwise, the method proceeds to step 507. Note that validating the signature is optional (as well as the signing being optional) and may occur on a periodic basis and thus, the signature may not be passed from the merchant computer 130 as well.

At step 507, remote key manager 140 decrypts the encrypted payment information using a remote key manager key stored at the remote key manager 140. The remote key manager key may include a symmetric or a private key of a public/private key pair. In embodiments using the remote key manager private key, the private key is configured to decrypt information that has been encrypted with a corresponding remote key manager public key and the public key is meant to be stored securely at the remote key manager 140 so that only the remote key manager 140 may be capable of decrypting information encrypted with the remote key manager public key. Similarly, the symmetric key may be stored at the remote key manager 140 and used to decrypt the encrypted payment information.

At step 508, remote key manager 140 re-encrypts the payment information using the determined merchant public key. As explained above, the merchant public key may be included in the merchant application certificate and extracted at any point during the remote transaction processing. The remote key manager 140 may determine the merchant public key in any suitable manner including extracting the public key from the merchant certificate, using a stored merchant public key for merchants registered with the remote key manager 140, etc.

At step 509, the remote key manager 140 generates and sends a transaction response including the re-encrypted payment information to the merchant application 121 of the mobile device 120. In some embodiments, the re-encrypted payment information may be further encrypted using the previously established session key for secure communication between the remote key manager 140 and the mobile device 120.

At step 510, the merchant application 121 sends the re-encrypted payment information to the merchant computer 130. The merchant application 121 may determine the appropriate merchant computer 130 in which to send the re-encrypted payment information through any suitable method. For example, routing information may be included in the payment response, the merchant application 121 may have a destination merchant computer 130 associated with the remote payment transaction when the payment is initiated, or the merchant application 121 may have a designated merchant computer 130 in which to send the payment response.

At step 511, the merchant computer 130 receives the re-encrypted payment information and decrypts the re-encrypted payment information using the merchant private key stored at the merchant computer 130. Thus, for the first time in the remote transaction processing, the merchant computer 130 may gain access to the payment information (e.g., payment credentials and/or other secure information) that the mobile payment application 123 obtained and encrypted from the secure memory of the mobile communication device. For example, the merchant server may obtain an account identifier (e.g., a primary account number (PAN)) and an expiration date associated with a payment account as well as a transaction specific cryptogram or dynamic value. The cryptogram provides additional authentication and validation opportunities for the payment processor and/or issuer and allows for minimized risk of fraud in such remote transactions.

At step 512, the merchant computer 130 may use the decrypted payment information to initiate and/or conduct a payment transaction. For example, merchant computer 130 may generate an authorization request message including information that would typically be present in card present transactions (e.g., payment credentials, chip data, etc.). Accordingly, the merchant computer 130 may map the decrypted payment information (as well as the other transaction information included in the payment response) to the format associated with an authorization request message of the merchant computer 130, acquirer computer 150, payment processing network 160, and issuer computer 170.

Figure 6:
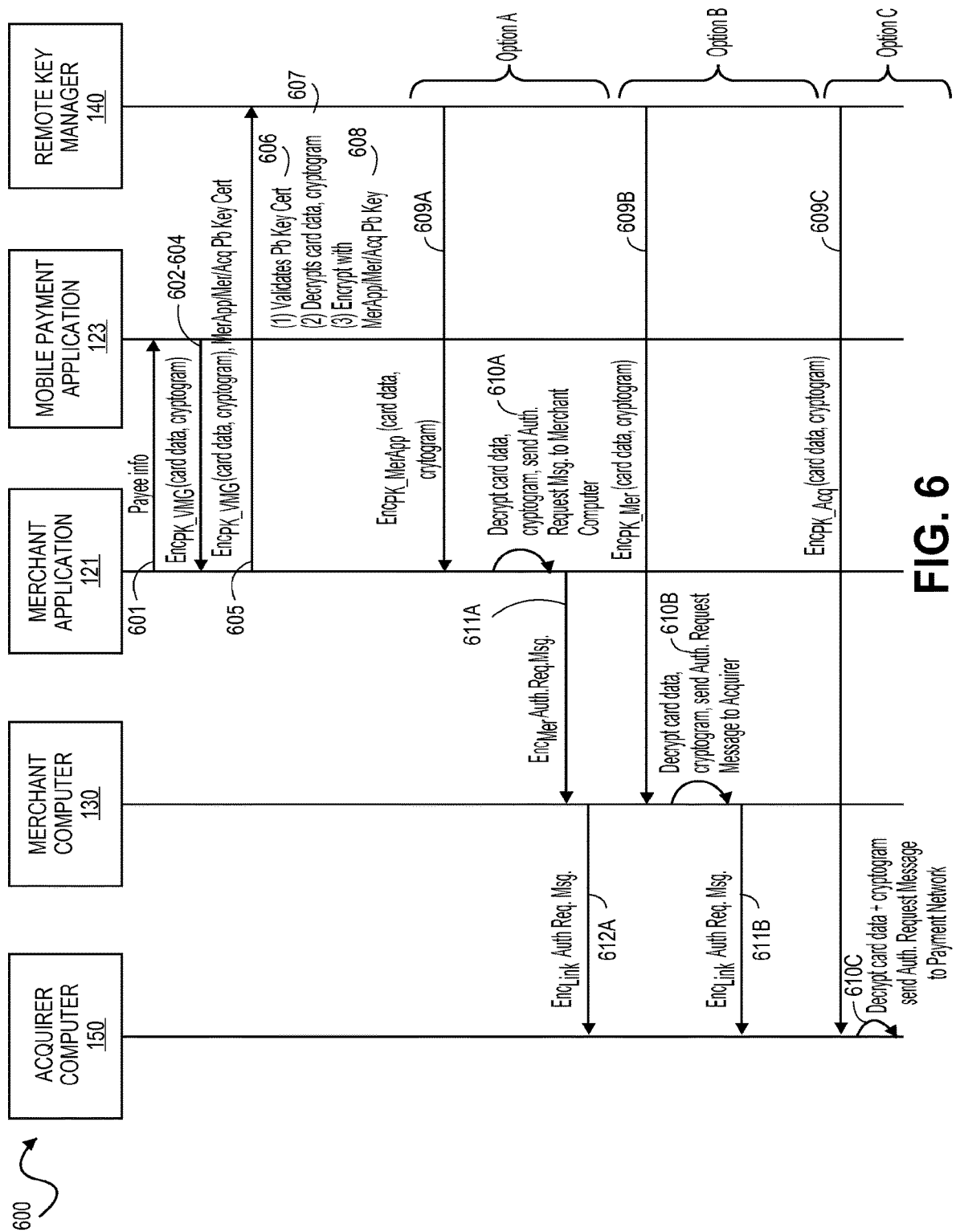
FIG. 6 shows additional exemplary methods for conducting a remote transaction using a remote key manager and a merchant application of a mobile device, according to some embodiments of the invention.

It should be understood that FIG. 5 is intended to be descriptive and non-limiting. For example, as will be shown below in reference to FIG. 6, any number of different entities may be used to decrypt the re-encrypted payment information. For example, FIG. 6 shows three different options for decrypting and passing payment information. Other transaction entities may also be configured to decrypt the re-encrypted payment information and initiate a payment transaction.

FIG. 6 shows additional exemplary methods for conducting a remote transaction using a remote key manager 140 and a merchant application 121 of a mobile device 120, according to some embodiments of the invention. For example, as shown in FIG. 6, after remote key manager 140 decrypts the encrypted payment information, remote key manager 140 may re-encrypt the payment information using a public key associated with any number of different transaction processing entities. For instance, instead of using a merchant application public key to encrypt the payment information, a merchant public key (associated with a private key stored at the merchant server computer) or an acquirer public key (associated with a private key stored at an acquirer computer 150) may be used to encrypt the payment information and the re-encrypted payment information may be passed to each respective entity (e.g., merchant server computer or acquirer computer 150) for decrypting and authorization request message generation.

Steps 601-608 (only some of which are shown in FIG. 6) are similar to those explained in reference to FIG. 5 above. For example, at step 601, a merchant application 121 sends payee information to a mobile payment application 123 of a mobile device 120 in order to identify appropriate payment information for the transaction. Further, at steps 602-604, the mobile payment application 123 encrypts the payment information using a remote key manager public key and sends the encrypted payment information to the remote key manager 140.

At step 605, however, depending on the configuration of the remote transaction processing system, any number of public key certificates (e.g., merchant application public key certificate, merchant public key certificate, acquirer public key certificate, etc.) may be passed to the remote key manager 140. The merchant application 121 may determine which public key certificate should be provided as well as routing information for the encrypted payment information once the re-encrypted payment information is returned from the remote key manager 140.

Steps 606-608 are similar to those described above in reference to steps 506-508 of FIG. 5, however, the identity of the transaction processor certificate may include any of the merchant application 121, the merchant computer 130, or the acquirer computer 150. Accordingly, the remote key manager 140 may validate the received public key certificate, decrypt the encrypted payment information (e.g., account identifier and cryptogram), and re-encrypt the decrypted payment information (e.g., card data and cryptogram), with the public key extracted from the received public key certificate. As explained above, the public key certificate may be associated with any transaction processor including, for example, a merchant computer 130, merchant application 121, or an acquirer computer 150.

At steps 609A-609C, the remote key manager 140 may send the re-encrypted payment information to a transaction processing entity (e.g., a merchant application 121, merchant computer 130, acquirer computer 150, etc.) associated with the received public key certificate (and subsequently the public key used to encrypt the payment information).

For example, for option A the public key certificate sent at step 605 included a merchant application public key certificate so the remote key manager 140 validates the certificate and extracts or otherwise obtains the merchant application public key. Accordingly, the merchant application public key is used to re-encrypt the decrypted payment information and at step 609A, the remote key manager 140 sends the re-encrypted payment information to the merchant application 121.

At step 610A, the merchant application 121 may receive the re-encrypted payment information, determine a merchant application private key associated with the re-encrypted payment information, and decrypt the re-encrypted payment information using the merchant application private key. Accordingly, the merchant application 121 may have the sensitive information that was stored on the secure element 122 as well as secure information that was generated using the secure algorithms of the mobile payment application 123 for the payment transaction. For example, the merchant application 121 may have a consumer's payment credentials (e.g., account identifier, expiration date, card verification value (CVV), personal information, etc.) as well as a cryptogram or other dynamic value that may be used to authenticate that the mobile payment application 123 used to generate the transaction data is authentic.

The merchant application 121 may then initiate a payment transaction using the decrypted payment information. The merchant application 121 may initiate the payment transaction using any suitable method. For example, the merchant application 121 may generate an authorization request message configured to be sent through a payment processing network 160. Alternatively, although not shown in FIG. 6, the merchant application 121 may encrypt the decrypted payment information again using a merchant server key and may send the payment information to the merchant computer 130 for decryption and initiation of the payment transaction. As such, the decrypted payment information may be passed to a merchant computer 130 for generation of an authorization request message or other initiation of a payment transaction.

At step 612A, the merchant computer 130 may send the authorization request message to an acquirer computer 150 associated with the merchant for processing of the transaction. The authorization request message may be sent along a secure communication channel using an encrypted link encryption key or encryption process. Accordingly, in some embodiments, the payment information included in the authorization request message may be encrypted an additional time and sent to the acquirer computer 150 for processing. Any other secure process may be used to send the authorization request message to the acquirer through a secure process. Although not shown in FIG. 6, the acquirer computer 150 may then forward the authorization request message to a payment processing network 160 that is configured to process the payment transaction as if the payment transaction were a card present or other local transaction.

In some embodiments, the payment processing network 160 may not be aware that the payment transaction is a remote payment transaction because the authorization request message may have the same secure data fields that other chip based card present transactions would have. Accordingly, the remote payment transaction may have the same security features and risks associated with card present transactions which may lead to fewer fraudulent transactions.

In some embodiments, the payment processing network 160 may determine that the authorization request message is associated with a remote payment transaction based on the type of cryptogram or dynamic data generated by the mobile payment application 123 or by a security level indicator provided in the payment information or authorization request message. For example, the mobile payment application 123, the merchant application 121, or the merchant computer 130 may provide a security level indicator that informs the payment network as well as issuers that the transaction originated remotely but was processed through the secure remote payment transaction processing method described herein. In such embodiments, there may be different security level indicators for a traditional key entered or non-secure card-not-present transaction. Accordingly, the security level indicator may inform the various entities as to who is liable for fraud in a payment transaction (e.g., a merchant vs. an issuer) as well as the risks associated with such transaction types.

The remote payment transaction may further be routed to an issuer associated with the payment credentials and an authorization decision may be made and the transaction may be authorized or declined, as described in detail above in reference to FIG. 1. An authorization response message may be generated and returned through the transaction processing system to the merchant server computer, the merchant application 121, the mobile payment application 123 (in order to update any account or transaction history information associated with the mobile payment application 123 or the secure element 122, and provided to the consumer 110. Accordingly, the transaction may be processed.

Alternatively, for option B the public key certificate sent at step 605 included a merchant public key certificate so the remote key manager 140 validates the certificate and extracts or otherwise obtains the merchant public key. Therefore, the merchant public key is used to re-encrypt the payment information and at step 609B, the remote key manager 140 sends the re-encrypted payment information to the merchant computer 130.

Any number of different methods may be used to send the re-encrypted payment information to the merchant computer 130. For example, the payment response message may include unencrypted routing information associated with the merchant computer 130 such that the merchant application 121 may automatically route the re-encrypted payment information to the merchant computer 130. Alternatively or in combination, the merchant application 121 may have the routing information (e.g., server computer address) associated with merchant computer 130 programmed into the merchant application 121 and when the transaction is initiated, the merchant application 121 may know that any respective payment response message may be routed to the merchant computer 130. Further, a flag or other data element in a message received including the re-encrypted payment information may indicate to the merchant application 121 as to where and in which entity to send the re-encrypted payment information.

Additionally, in some embodiments, the remote key manager 140 may be configured to send the payment response directly to the merchant computer 130. Accordingly, the remote key manager 140 may use address information included in the merchant certificate, merchant information provided during registration for the remote payment processing service, or merchant information provided in the purchase request to determine the appropriate merchant server computer in which to send the purchase response directly.

At steps 610B-611B, the merchant computer 130 may decrypt the re-encrypted payment information, initiate a payment transaction, and send an authorization request message to an acquirer as described in steps 611A-612A above.

Additionally, for option C the public key certificate sent at step 605 included an acquirer public key certificate so the remote key manager 140 validates the certificate and extracts or otherwise obtains the acquirer public key. Therefore, the acquirer public key is used to re-encrypt the payment information and at step 609C, the remote key manager 140 sends the re-encrypted payment information to the acquirer computer 150. Similar processes to those described above regarding sending the merchant public key encrypted payment information may be used to send the encrypted payment information to the acquirer computer 150 including either routing the information through the merchant application 121 and merchant computer 130 or directly sending the encrypted payment information to the acquirer computer 150.

At step 610C, the acquirer computer 150 may decrypt the re-encrypted payment information, initiate a payment transaction, and send an authorization request message to an acquirer as described in steps 611A-612A and 610B-611B above.

Accordingly, there are many options for securely processing the remote payment transaction in order to pass sensitive information from a mobile payment application 123 of a mobile device 120 to remote merchant server computer without allowing the sensitive information to be intercepted by malicious third parties and while providing the security benefits of card-present or local transactions while completing a remote payment transaction.

II. Systems and Methods for Processing Remote Mobile Payment Transactions Using a Mobile Gateway Associated with a Payment Processing Network Another embodiment of the present invention includes a system for performing a remote transaction using a mobile gateway 190 associated with a payment processing network computer 161. Interfacing with a payment processing network 160 may allow for a number of advantages including additional authentication capabilities including validation of authentication values before a transaction is submitted through a payment network using an authorization request message to the payment processing network 160. Accordingly, the payment processing network 160 may perform additional authentication processes (e.g., risk management, velocity checks, etc.) on the payment request (and associated consumer account) before a payment is initiated, which may allow the payment processing network 160 to inform a merchant system whether a transaction is authentic before the payment transaction is initiated through an authorization request message. The merchant may subsequently alter risk decisioning, authentication processes, and any other transaction processes based on the authentication results provided by the payment processing network.

Additionally, by interfacing with the payment processing network 160, the payment processing network 160 may allow an additional layer of transaction authentication by generating an authorization response value that may be validated by a payment processing network 160 before a transaction is authorized.

Figure 7:
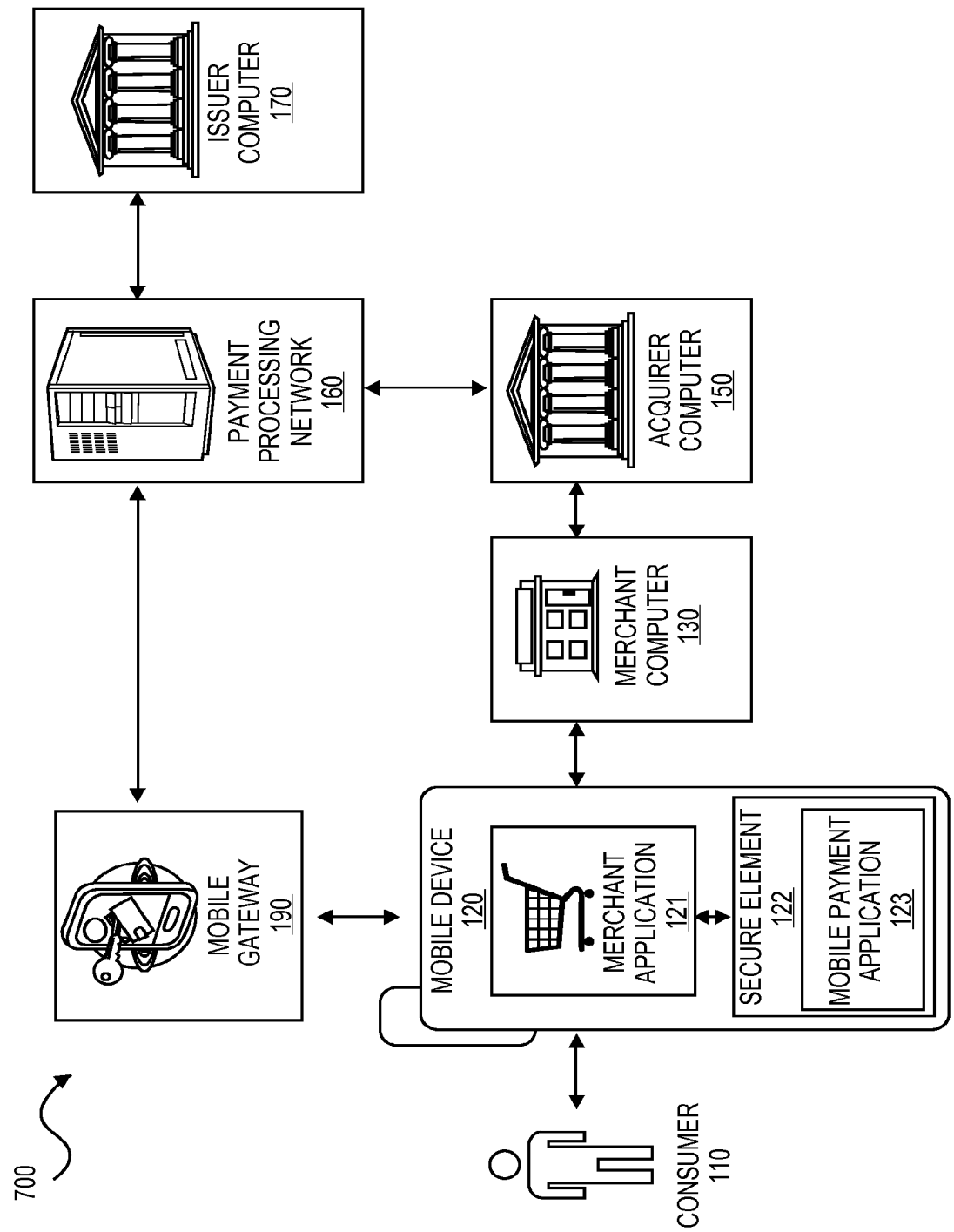
FIG. 7 shows a block diagram of an exemplary system for performing a remote transaction using a mobile gateway associated with a payment processing network and a merchant application of a mobile device, according to some embodiments of the invention.

FIG. 7 shows a block diagram of an exemplary system 700 for performing a remote transaction using a mobile gateway 190 associated with a payment processing network 160 and a merchant application 121 of a mobile device 120, according to some embodiments of the invention. As can be seen in FIG. 7, the remote transaction processing system 700 is similar to that shown in FIG. 1, however, instead of an independent remote key manager 140, the system 700 includes a mobile gateway 190 that allows the mobile device 120 to communicate the encrypted payment information of the payment request directly to the payment processing network 160 that is configured to process the remote payment transaction. The payment processing network 160 may be capable of providing a number of additional features and capabilities for the secure remote payment transaction processing method as is described in further detail below.

A description of the majority of the entities of the system of FIG. 7 may be found above in reference to FIG. 1, so a detailed explanation is not provided here. However, the mobile device 120 of FIG. 7 is configured to communicate with a mobile gateway 190 which is configured to communicate with a payment processing network 160 that may be associated with or responsible for processing the remote payment transaction.

The mobile gateway 190 may comprise a mobile gateway encryption key that may be shared with a mobile payment application 123 stored on the secure element 122 of the mobile device 120. The mobile gateway encryption key may be symmetric or of a public/private encryption key pair. The mobile gateway encryption key may be provisioned into the mobile payment application 123 and may allow the mobile payment application 123 to initiate a secure channel with the mobile gateway 190 which may allow the mobile payment application 123 to provide end-to-end encryption for communications between the mobile payment application 123 and a payment processing network computer 161. Alternatively or in combination, the mobile payment application 123 may use a mobile gateway public key to securely encrypt and communicate information to and from the mobile gateway 190. Accordingly, the mobile gateway 190 may be configured to decrypt encrypted payment information that is encrypted using a public key or other secure encryption key stored on the secure element 122 of the mobile device 120. Accordingly, sensitive data may be securely shared between the mobile device 120 and the mobile gateway server computer.

The mobile gateway 190 may include a secure channel generation module that is configured to configure a secure communication link between the mobile gateway 190, a mobile device 120, and a payment processing network computer 161. The secure channel generation module may exchange any relevant information in order for the mobile payment application 123 and the mobile gateway 190 to generate matching or complimentary session keys for securely communicating sensitive information. Any other suitable method for generating a secure channel may be implemented.

Further information regarding the capabilities of the mobile gateway 190 may be found in U.S. application Ser. No. 13/662,843, filed Oct. 29, 2012, titled "Over The Air Update of Payment Transaction Data Stored in Secure Memory," U.S. application Ser. No. 12/563,410, filed Sep. 21, 2009, titled "Apparatus and Method for Preventing Unauthorized Access to Payment Application Installed in Contactless Payment Device," and U.S. application Ser. No. 13/563,421, filed Sep. 21, 2009, titled "Over The Air Update of Payment Transaction Data Stored in Secure Memory," which are hereby incorporated by reference in their entirety, for all purposes.

In addition to the modules described above in reference to FIG. 1, the payment processing network 160 of FIG. 7 may have a number of other modules associated with the remote payment transaction processing capabilities described herein. For example, the payment processing network 160 may further comprise a private key of a public/private encryption key pair (e.g., a payment processing network encryption key pair) and the payment processing network public encryption key may be shared with a merchant computer 130 that has registered for the payment processing network 160 provided remote transaction processing. Note that the mobile gateway 190 and the modules described herein for the payment processing network 160 could be found integrated into a single entity or could be separated into additional entities as well. For example, the mobile gateway 190 could be integrated into the payment processing network server computer 161 or the encryption and decryption functions of the payment processing network 160 could be incorporated into the mobile gateway 190.

Figure 8:
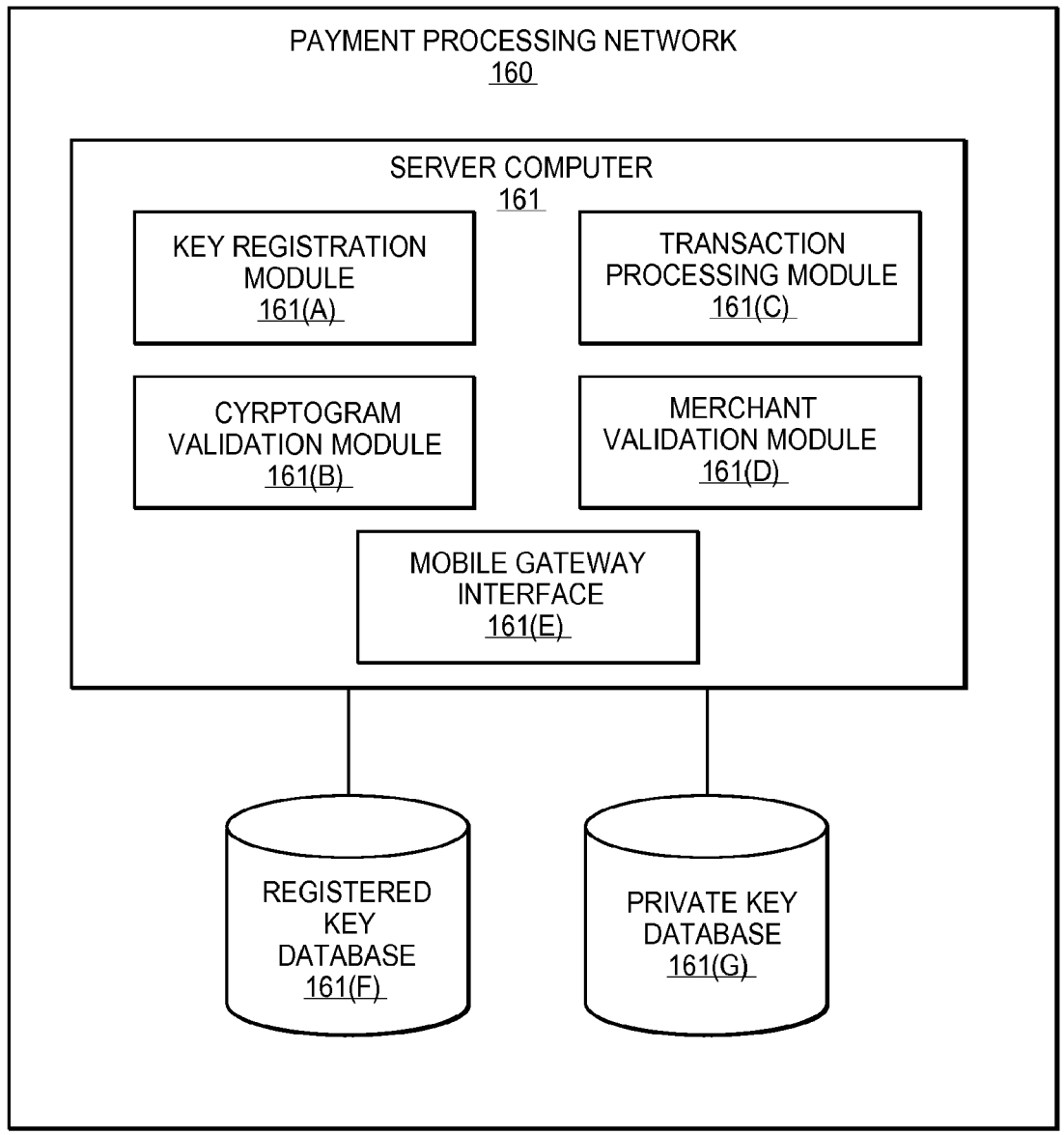
FIG. 8 shows a block diagram of an exemplary payment processing network configured to manage transaction processing encryption keys for remote transactions and process secure remote transactions, according to some embodiments of the invention.

FIG. 8 shows a block diagram of an exemplary payment processing network 160, according to some embodiments of the invention. The payment processing network 160 may comprise a server computer 161, a registered key database 161(F), and a private key database 161(G). The server computer 161 may comprise a key registration module 161(A), a cryptogram validation module 161(B), a transaction processing module 161(C), a merchant validation module 161(D), and a mobile gateway interface 141(E). The server computer 161 may further comprise a processor (not shown) and a computer-readable medium (not shown) coupled to the processor, the computer-readable medium comprising code, executable by the processor, for performing a method as described in embodiments herein.

A key registration module 161(A) may include any software module that is configured to register encryption keys, shared secrets, and/or any other transaction processor (e.g., merchant application 121, merchant computer 130, acquirer computer 150, etc.), information with the payment processing network computer 161 to allow for processing of remote payment transactions.

A registered key database 161(F) may comprise the registered public keys from public/private key pairs associated with the various merchants, merchant applications, acquirers, and/or any other transaction processors that have registered for remote transaction processing. The registered key database 161(F) may include any suitable information for obtaining an appropriate public key for a given transaction including the public keys being stored with the corresponding public key certificate and/or being associated with a particular merchant identifier that is provided during registration. The merchant identifier may be included in a payment request which may allow the transaction processing module 161(C) of the payment processing network 160 to identify the appropriate transaction processor public key associated with the transaction.

A private key database 161(G) may include a database or local memory of the payment processing network server computer 161 that includes a payment processing network private key associated with a payment processing network public key from a public/private key pair. The private key database 161(G) may be secure and may keep the private key secure and only accessible from the payment processing network server computer 161. In some embodiments, there could be multiple private keys associated with the payment processing network 160.

A merchant validation module 161(D) may include any software module that is configured to validate the registration of a merchant (or other transaction processor) associated with a remote payment transaction. For example, the merchant validation module 161(D) may determine whether the merchant has been registered with the payment processing network computer 161 to ensure that the payment processing network 160 has access to a public key associated with the merchant computer 130 or merchant application 121. Similarly to the functionality of the remote key manager 140 described above in reference to FIG. 3, the merchant validation module 161(D) may validate a merchant public key certificate if one is provided to ensure the merchant certificate is currently valid and active. If the merchant (or other transaction processor) cannot be validated, the remote payment transaction processing may be stopped.

A cryptogram validation module 161(B) may include any software module that is configured to validate a cryptogram or other dynamic authentication value associated with a payment request. The cryptogram validation module 161(B) may use shared secrets or shared algorithms to validate a cryptogram that uses repeatable input data to re-calculate and compare a dynamic cryptogram for a transaction. For example, the cryptogram or other dynamic value may be generated by the mobile payment application 123 using an account identifier, expiration date, transaction time, transaction amount, or any other suitable transaction information that may be available to both the mobile payment application 123 and the payment processing network 160 (or an issuer computer or other processing entity). The shared algorithm may be shared between the mobile payment application and the payment processing network (or issuer or other processing entity).

Further, the cryptogram validation module 161(B) may be configured to generate an authentication response value using a secret algorithm securely stored at the payment processing network 160 and the secret algorithm is not shared with any other entities in the remote transaction processing system. Accordingly, the cryptogram validation module 161(B) may validate the dynamic cryptogram generated by the mobile payment application 123 and may return another dynamic cryptogram (e.g., authentication response value) that may be returned to the mobile device 120 and submitted with any authorization request message that is generated for the transaction. Accordingly, the payment processing network 160 may obtain the authentication response value during the transaction processing of the authorization request message and may validate that the authentication response value matches the generated authentication response message originally generated by the payment processing network 160 during the initial processing of the remote payment transaction. Accordingly, the payment processing network 160 may be assured that the transaction has not been altered and that the transaction data is the same as the transaction that was originally authenticated by the payment processing network computer 161.

A transaction processing module 161(C) may include any software module that is configured to receive a payment request including encrypted payment information, decrypt the encrypted payment information, determine a transaction processor public key, re-encrypt the decrypted payment information with the public key, and provide a payment response including the re-encrypted payment information to the transaction processor.

The mobile gateway interface 161(E) may allow the payment processing network 160 to interface with the mobile gateway 190 and obtain communications from the mobile gateway 190 that the payment processing network 160 may be capable of decrypting or that may already be decrypted.

Figure 9:
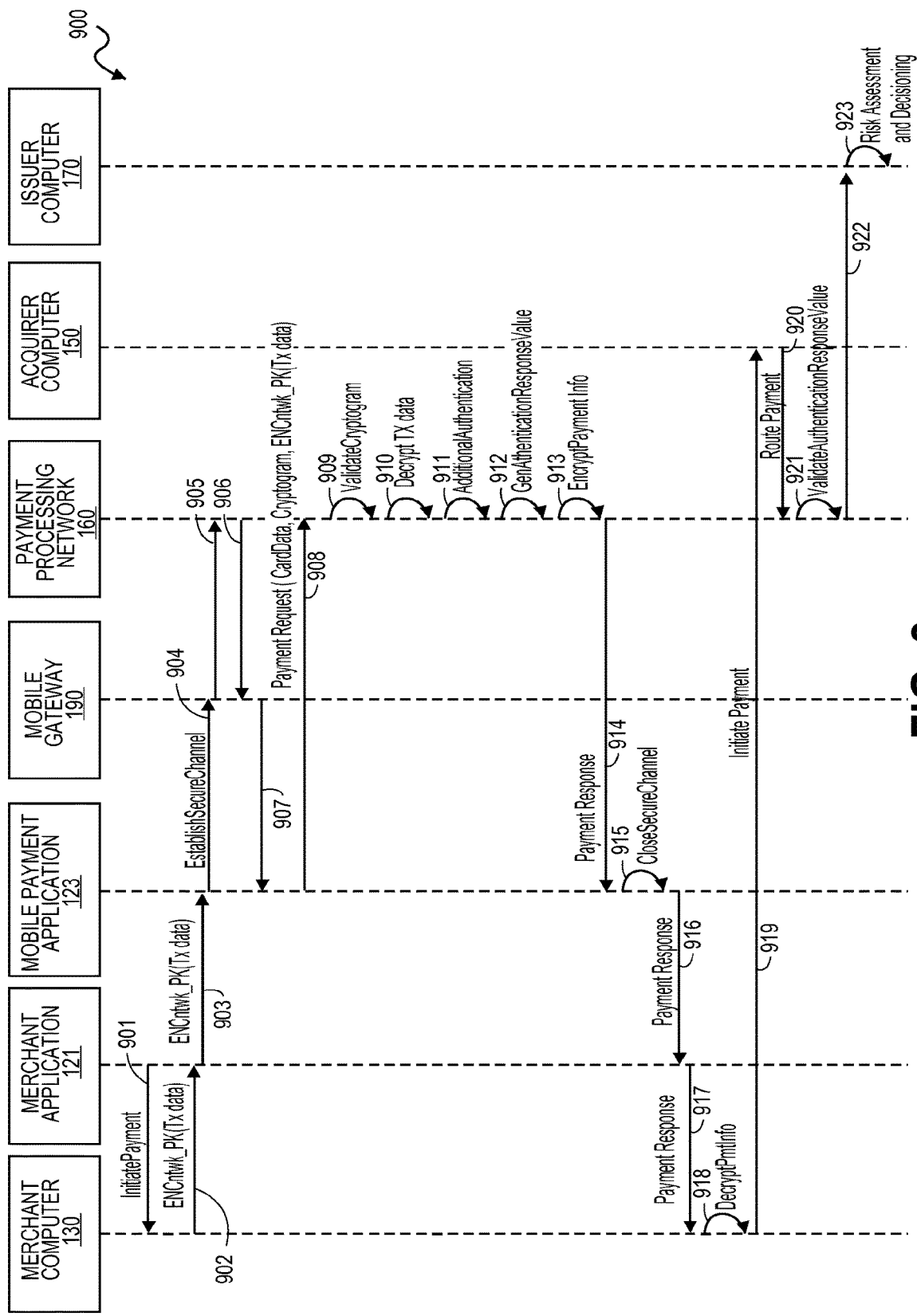
FIG. 9 shows a flow diagram of an exemplary method for processing a remote transaction using a mobile gateway associated with a payment processing network and a merchant application of a mobile device, according to some embodiments of the invention.

FIG. 9 shows a flow diagram of an exemplary method 900 for performing a remote transaction using a mobile gateway 190 associated with a payment processing network 160 and a merchant application 121 of a mobile device 120, according to some embodiments of the invention.

At step 901, a consumer 110 initiates a remote payment transaction using the merchant application 121 and the merchant application 121 sends a message to the merchant server computer indicating that the consumer 110 would like to initiate a remote transaction.

At step 902, the merchant computer 130 responds by generating, encrypting, and sending transaction information encrypted with a payment processing network public key for the remote payment transaction to the merchant application 121 of the mobile device 120. The payment processing network public key may include a registered key provided by the payment processing network computer 161 during registration of the merchant for the remote payment transaction process. The transaction information may include, for example, a merchant identifier, a transaction amount, an authentication type for the transaction, a transaction identifier, and any other relevant information for processing the remote transaction. The transaction information may be encrypted using a payment processing network public key that was provided to the merchant server computer during registration for the remote payment transaction processing functionality.

At step 903, the merchant application 121 forwards the encrypted transaction data to the mobile payment application 123 of the mobile device 120. In this embodiment, the merchant application 121 may not alter or change the transaction data and may merely act as an intermediary between the merchant computer 130 and the mobile payment application 123.

At steps 904-907, a secure channel is established and communications are sent between the mobile payment application 123, the mobile gateway 190 associated with the payment processing network 160, and the payment processing network computer 161 in order to initialize and prepare the secure channel. The secure channel allows for future communications between the mobile device 120 and payment processing network 160 to be encrypted and secured from interception.

The secure channel may be established in any suitable manner. For example, the secure channel may be established using a mobile gateway encryption key provisioned into the mobile payment application 123 during personalization of the mobile payment application 123. Accordingly, the encryption keys used to establish the secure channel may include a session key that changes for each session or remote payment transaction. A similar process is described in U.S. patent application Ser. No. 13/075,592, to Aabye et al., filed Mar. 30, 2011, which is hereby incorporated by reference in its entirety.

Further, the encryption key may be a unique derived key (UDK) that is derived from a master key provided by a mobile payment application 123 issuer, a trusted service manager (TSM) associated with a secure element 122, or a secure element issuer. Additionally, any other suitable encryption method may be implemented as one of ordinary skill would recognize. As such, the secure connection may be implemented using data encryption standards such as, e.g., RSA with a key of at least 1024 bits, triple data encryption standard (DES), 128-bit advanced encryption standard (AES), an RC4 stream encryption algorithm using minimum 128-bit key length, etc.

At step 908, after the secure channel has been established, the mobile payment application 123 may generate and send a payment request including encrypted payment information using payment credentials stored in the secure element 122 and a mobile gateway encryption key stored or derived using information stored in the secure element 122 (e.g., a shared encryption key or manner for generating a unique derived key for each session). The payment request may include the encrypted transaction data received from the merchant computer 130 and the merchant application 121 without further altering or gaining access to the encrypted transaction information. The encrypted payment information may include payment credentials, a transaction cryptogram or other dynamic value, and any other information that the mobile gateway 190 and/or payment processing network 160 to process the remote transaction payment request. Note that in this embodiment, the encrypted payment information may be encrypted with the session key which may include a different encryption key than the network public/private key pair.

Accordingly, the mobile gateway 190 may decrypt the encrypted payment information provided by the mobile payment application 123 without affecting the encrypted transaction information that is passed from the merchant server and is encrypted with a payment processing network public key. Therefore, the mobile gateway 190 may use one encryption key for communication over the secure channel and the payment processing network 160 may use a different encryption key for decrypting the encrypted transaction information provided by the merchant computer 130. Therefore, the mobile payment application 123 may use a first key (e.g., a session key) to generate and securely pass payment credentials and consumer information stored in the secure element 122 of the mobile device 120 and the payment processing network 160 may use a second key (e.g., a payment processing network private key) to decrypt the transaction information passed from the merchant server computer.

At step 909, the cryptogram validation module 161(B) of the payment processing network computer 161 validates the cryptogram in the received payment request as being generated by an authentic mobile payment application 123. A validation cryptogram may be generated by the payment processing network 160 using transaction information and/or payment information that is shared between the payment processing network 160 and the mobile payment application 123 through the secure channel provided by the mobile gateway 190. If the received cryptogram matches the generated validation cryptogram, the payment processing network 160 may determine that the payment information was generated by a valid and authenticate mobile payment application 123.

At step 910, the transaction processing module 161(C) of the payment processing network computer 161 may decrypt the transaction data using a private key associated with the payment processing network 160. The decrypted transaction information may include a merchant identifier or any other merchant information so that the payment processing network 160 may determine the identity and the associated public key in which to use to process the remote payment transaction. Additionally, the merchant validation module 161(D) of the payment processing network 160 may validate that the merchant associated with the decrypted transaction information is registered, valid, active, and in good standing with the remote payment transaction processing system.

At step 911, the decrypted payment information may be authenticated using any number of internal or external authentication processes. For example, a risk based, stored credential, challenge-response, or any other type of consumer authentication process may be completed. In some embodiments, the mobile gateway 190 may request authentication information from the consumer 110 through an authentication request, a challenge, a request for a password, or through any other suitable method. Alternatively or in combination, the payment processing network computer 161 may determine whether the merchant application 121 or mobile payment application 123 previously authenticated the consumer 110 and may use this information to determine whether to perform consumer authentication processes and which authentication processes to perform. For example, information related to cardholder verification methods performed by a merchant application 121 before the transaction is initiated may be passed to the payment processing network computer 161.

At step 912, if the authentication processes are successful and the cryptogram is validated, the cryptogram validation module 161(B) may generate an authentication response value for the transaction using the private key associated with the mobile gateway 190 or the payment processing network 160. The authentication response value may be validated by the payment processing network 160 during authorization processing in order to provide an additional level of authentication for the transaction by indicating that the transaction was previously analyzed and authenticated by the payment processor network computer and has not been altered.

At step 913, the transaction processing module 161(C) encrypts the payment information using the identified merchant public encryption key that was registered and is stored at the payment processing network 160.

At step 914, the mobile gateway interface 161(E) of the payment processing network computer 161 sends a payment response including the encrypted payment information to the mobile payment application 123 of the mobile device 120 using the secure channel. The mobile payment application 123 may not access the encrypted payment information since the mobile payment application 123 does not have access to a merchant private key.

At step 915, the mobile payment application 123 closes the secure channel connection to the mobile gateway 190. In some embodiments, the mobile gateway 190 may close the secure channel after sending the payment response including the encrypted payment information.

At step 916, the mobile payment application 123 returns the payment response including the encrypted payment information to the merchant application 121. The payment response may include any information to identify the transaction and inform the mobile payment application 123 as to which merchant application 121 in which to send the encrypted payment information.

At step 917, the merchant application 121 receives the payment response including the encrypted payment information and forwards the encrypted payment information to the merchant server computer.

At step 918, the merchant server computer receives the payment response including the encrypted payment information and decrypts the encrypted payment information using a merchant private key stored securely at the merchant server. Accordingly, the merchant server computer now has the secure payment credentials, the authentication response value, a security level, a liability indicator, transaction data, and any other relevant information to initiating a payment transaction.

At step 919, the merchant server computer initiates a payment transaction by generating an authorization request message using the decrypted payment information. The authorization request message may have the decrypted payment information mapped to predetermined fields within the authorization request message in order to allow transaction entities within the transaction ecosystem to identify an account, an authentication level, and process the transaction.

At step 920, the authorization request message may be sent to an acquirer computer 150 associated with the merchant computer 130 and the acquirer computer 150 may route the authorization request message to a payment processing network associated with the issuer identifier (e.g., a BIN) or account identifier (e.g., primary account identifier) provided in the authorization request message.

At step 921, the payment processing network 160 may validate the authentication response value in the authorization request message. The payment processing network 160 may parse the authorization request message to determine the authentication response value and may access the mobile gateway private key or another payment processing network private key used to generate the authentication response value in order to generate a validation authentication value. If the validation authentication value and the authentication response value match, the payment processing network 160 may know that the transaction was previously authenticated and determine that the likelihood that this transaction is fraudulent is low. Accordingly, the transaction may be immediately authorized or additional authentication information may be provided to an issuer to inform them that the transaction is likely authentic and should be authorized.

At step 922, the payment processing network 160 forwards the authorization request message to an issuer computer 170 associated with the consumer account.

At step 923, the issuer computer 170 may perform a risk assessment and authorization decisioning process where the issuer computer 170 may parse the relevant information from the authorization request message including authentication response value, any validation information from the payment processing network 160 related to the transaction (e.g., a risk score, results of other authentication processes, etc.) and may make a decision regarding whether the transaction is authorized. Although not shown in FIG. 9, the issuer computer 170 may then generate and return an authorization response message including an indication as to whether the transaction is authorized back through the payment network and ultimately to the merchant computer 130 and the consumer 110 (through the mobile device 120) as to whether the transaction is authorized and is successfully completed.

III. Systems and Methods for Processing Remote Mobile Payment Transactions Using a Third Party Service Provider (e.g., Mobile Wallet Provider)

Additionally, some embodiments of the present invention may include a third party service provider (e.g., mobile wallet provider, mobile network provider, device manufacturer, etc.) with a relationship with the consumer 1010 providing the security features of the remote key manager 140 described in relation to FIG. 1. The third party service provider may provision a secure remote transaction application 1025 on the secure element 1022 and use the remote transaction application 1025 to obtain payment credentials from the mobile payment application 1023, decrypt the payment information received from the mobile payment application 1023, and encrypt the payment information for delivery to the third party server computer.

FIG. 10 shows a block diagram of an exemplary system for processing a remote transaction using a third party service provider (e.g., mobile wallet provider) and a merchant application 1021 of a mobile device 1020, according to some embodiments of the invention. The system is similar to FIGS. 1 and 7 and the major differences may be discussed in more depth below.

Embodiments shown in FIG. 10 include additional configuration options for the remote transaction processing system including the use of tokens to identify the account of a consumer 1010 and the use of registered merchant keys where the third party service provider 1040 is a mobile wallet provider. The configuration of FIG. 10 is illustrative only and the various parties and use of tokens could be used in any of the systems described above.

As shown in FIG. 10, the payment processing network 1060 may also be communicatively coupled to or incorporated with a token registry 1061. The token registry 1061 may include any database or other storage memory where tokens may be issued to a mobile device 1020 and associated with issuer accounts such that transactions may be processed using tokens instead of primary account numbers/identifiers (PANs).

The mobile device 1020 may comprise a merchant application 1021, a remote transaction SDK 1024, API, or other third party service layer that may be incorporated into the merchant application 1021 in order to allow the merchant application 1021 to interface with the remote transaction application 1025 stored in the secure element 1022, a remote transaction application 1025 installed on a secure element 1022 of the mobile device 1020, and a mobile payment application 1023 stored in the secure element 1022 of the mobile device 1020.

The remote transaction SDK 1024 or third party service layer may include any API, application, applet, or other executable code suitable to interface with a secure application and/or the third party server system (e.g., mobile wallet provider, remote key manager, etc.). For example, the remote transaction SDK 1024 may be embedded in a merchant application 1021 and may be used by the merchant application 1021 to retrieve payment information from a secure remote transaction application 1025 on a secure element 1022 in order to interface with a mobile payment application 1023 provisioned on a secure element 1022, communicate with a merchant application 1021, and communicate with a third party system. In some embodiments, remote transaction SDK 1024 or third party service layer may be secured and embedded in the secure element 1022. Additionally, although the remote transaction SDK 1024 is shown as part of the merchant application 1021, the remote transaction SDK 1024 could also be an independent application or could be embedded into an operating system of the mobile device 1020.

The remote transaction application 1025 includes a secure application provisioned into the secure element 1022 of the mobile device 1020. The remote transaction application 1025 provides a secure area for the storage of a public key certificate and/or public key for the third party service provider system (e.g., mobile wallet provider). Additionally, the remote transaction application 1025 may provide mobile payment application 1023 access control verification (e.g., provides security functions for the mobile payment application 1023) by only allowing access to the mobile payment application 1023 when a consumer 1010 has provided secure credentials or otherwise been authenticated. For example, if a signature cannot be validated or if a certificate is not matched with a certificate authority 180, the remote transaction application 1025 may decline a request for a remote transaction from the merchant application 1021 and the transaction processing may end (and the consumer 1010 may be prompted to try a different payment method or to try again). Alternatively, if the certificate is valid the remote transaction application 1025 may pass the request for the payment information to the mobile payment application 1023.

A third party service provider system (e.g., mobile wallet provider 1030) may include any entity that has an interest or relationship with the consumer 1010, mobile device 1020, merchants, payment processing network 1060, or any other payment transaction processing methods or systems. For example, the third party service provider system may comprise a mobile wallet provider, a mobile device manufacturer, a mobile network operator, or any other entity that may interface with merchants and consumer devices. Accordingly, embodiments of the present invention may allow for a third party service provider system to register merchants and manage authentication processes for merchant remote transactions to provide more secure processing of remote transactions.

The registered keys of the mobile wallet provider may include any public encryption keys used to encrypt the payment information while processing the remote transaction. For example, while merchants are on-boarding or registering with the remote payment transaction service provided by the mobile wallet provider, the merchant may send the mobile wallet provider a public key and/or public key certificate that the mobile wallet provider may use to encrypt the payment information before sending to the merchant server computer so that the merchant computer 1030 is capable of decrypting the payment information. Although not shown in FIGS. 10-11, the mobile wallet provider (or other third party) may also use embodiments where the keys are determined through the use of public key certificates as described in reference to FIGS. 1-6.

Figure 11:
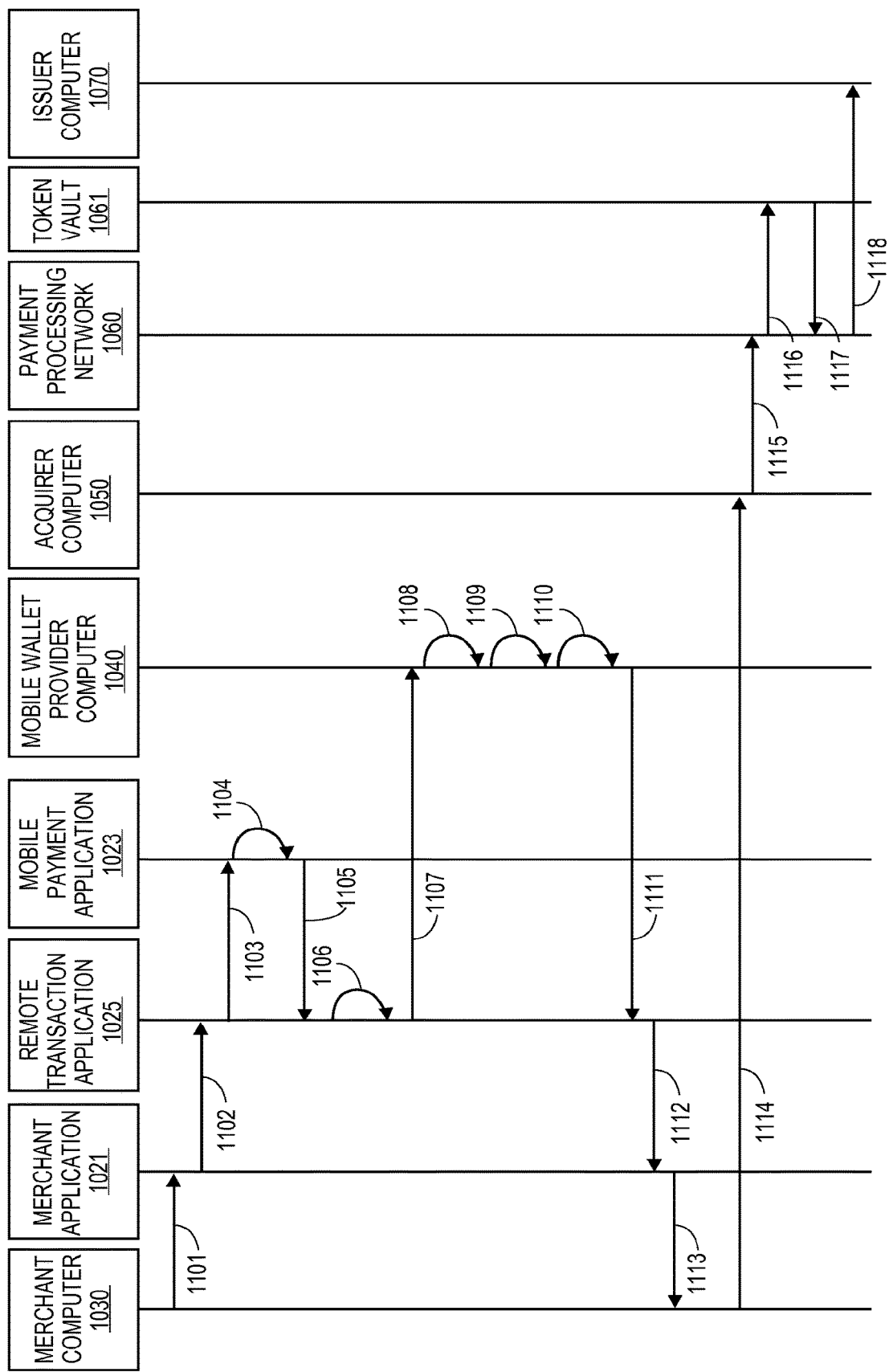
FIG. 11 shows a flow diagram of an exemplary method for processing a remote transaction using a third party service provider (e.g., mobile wallet provider) and a merchant application of a mobile device, according to some embodiments of the invention.

FIG. 11 shows a flow diagram of an exemplary method 1100 for processing a remote transaction using a third party service provider (e.g., mobile wallet provider) and a merchant application 1021 of a mobile device 1020, according to some embodiments of the invention.

At step 1101, a consumer 1010 finishes their shopping experience through a merchant application 1021 that communicates with a merchant online or e-commerce store. When the consumer 1010 is prepared to checkout of their shopping experience and complete the purchase, the consumer 1010 may log into a third party applet or remote transaction application 1025 or service layer present on the mobile device 1020 using a third party (e.g., mobile wallet provider) credential. The consumer 1010 may then initiate a checkout through the merchant application 1021. The merchant application 1021 may provide an option to select a payment card or account for payment through a remote transaction application 1025. The consumer 1010 may select an account in order to initiate payment.

At step 1102, the merchant application 1021 sends payee information to a remote transaction application 1025 using a remote transaction software development kit (SDK) or other third party service layer or application located on the mobile device 1020. In one embodiment, the remote transaction SDK 1024 or remote transaction application 1025 may include a service layer that is configured to interface between a merchant application 1021 and a remote transaction applet 1024 stored on a secure element 1022 of the mobile device 1020. Alternatively, the remote transaction application 1025 may also be stored in general purpose memory of the mobile device 1020 and may be configured to communicate with a third party server platform 1030 (e.g., mobile wallet provider). Either way, the remote transaction application 1025 may be configured to communicate with a mobile payment application 1023 (e.g., Visa™ Paywave™ application) that is stored on a secure element 1022 of the mobile device 1020.

At step 1103, the remote transaction SDK 1024 or remote transaction application 1025 communicates the payee information with a remote transaction application 1025 residing in the secure element 1022. The remote transaction application 1025 may then use APIs or other commands to request that the mobile payment application 1023 (e.g., Visa™ Paywave™ application) provide provisioned payment credentials (e.g., a payment token, primary account number (PAN), pseudo-PAN, Ghost PAN, expiration date, etc.) that are stored on the secure element 1022 in a secured manner.

At step 1104, the mobile payment application 1023 may use the received payee information to retrieve and generate payment information using the secure element 1022. For example, the mobile payment application 1023 may access token information from the secure element 1022 and generate a payment request payload (including token data elements) and a dynamic value (e.g., authentication value) using the payee information, the token, and the information associated with the token (e.g., token expiration date). For instance, payment information may include a token (or PAN, pseudo-PAN, PAN substitute, etc.), a token expiration date, a unique transaction identifier (e.g., a Nonce), token authentication data (e.g., a dynamic value or cryptogram—such as a CAVV, dCVV, etc.), and an authentication and/or security level indicator (e.g., ECIS value). Payment information may further include any transaction information that may be useful in processing the transaction (e.g., amount, merchant identifier, etc.).

A token may include any payment credential that is issued or known at a token registry 1061 coupled to a payment processing network 1060 or other payment entity. The token may be a PAN substitute such that the token may have the same format as a typical primary account number (PAN) and be processed through existing payment processing infrastructure. Alternatively, the token may be any other possible format such that it is associated with the PAN or other account identifier at the token registry 161. Embodiments of the present invention may enable a token that may be stored in a secure element 1022 and used for transactions initiated using the mobile payment application 1023 to be used in remote payment transactions.

Authentication data may include any cryptogram value that is generated by a secure algorithm, key, or other secured and protected method stored in the mobile payment application on the secure element. Accordingly, the authentication data (in this case "token authentication data") may be similar to a CAVV, a dCVV, or any other dynamic value used for authentication that is generated and sent during card present, chip-based, or in-person payment transactions. The authentication data assures the payment processing network that the payment request was generated by a secure application and allows a payment processing network to determine that the transaction has a higher level of security. Accordingly, the token authentication data may be generated using independent algorithms or encryption keys located on the secure element and the payment processing network, respectively.

When the payment processing network receives the authorization request message generated during the transaction, the payment processing network may generate another authentication data cryptogram and compare the independently generated authentication data to the received authentication data. If they match, the transaction may be authenticated as being generated by an authentic mobile payment application. However, if the token authentication data does not match, the transaction may be declined, the security level may be downgraded to a typical e-commerce transaction, or any other suitable steps may be taken by the payment processing network to inform parties in the transaction processing environment that the transaction may be fraudulent or an error may have occurred.

An authentication and/or security level indicator may include any indicator that allows some or all of the parties in a transaction processing environment to understand the risk level and authentication level of the present transaction. For example, the authentication and/or security level indicator may inform all of the parties that a new liability rules or scheme is being implemented since the transaction has a high level of assurance based on the presence of the generated authentication data (e.g., dynamic value or cryptogram).

Further, at step 1104, the mobile payment application 1023 may use a third party public encryption key to encrypt the remote transaction request payload including the token, token authentication data, and other transaction data. In some embodiments, the mobile payment application 1023 may determine the third party public key using a third party certificate stored on the mobile device 1020 or may access the third party public key through a certificate authority 180 or other database. The public key may be provisioned into the mobile payment application secure element 1022 and the mobile payment application 1023 may have access to the third party public key. Alternatively or in combination, the mobile payment application 1023 may have an encryption key (either symmetric or a public key of a public/private key pair) associated with the remote transaction application 1025 provisioned into the secure element 1022 and encrypt the payment information using the provisioned key. Alternatively, because both the mobile payment application 1023 and the remote transaction application 1025 are operating within the secure element 1022, the mobile payment application 1023 may pass the payment information in an unencrypted format such that no encryption keys are necessary.

At step 1105, the mobile payment application 1023 sends the payment information (either encrypted or not) to the remote transaction application 1025.

At step 1106, the remote transaction application 1025 may determine whether the payment information is encrypted and if so, may obtain an encryption key for decrypting the encrypted payment information. The remote transaction application encryption key may include any suitable encryption key based on the key provisioned or used by the mobile payment application 1023 to encrypt the payment information. The key may be symmetric or a private key associated with the public key used to encrypt the payment information from the mobile payment application 1023. Either way, the remote transaction application 1025 decrypts the encrypted payment information (if it is encrypted) and obtains the payment information including the payment credentials. Additionally, the remote transaction application 1025 may re-encrypt the decrypted payment information with a third party server computer public encryption key (e.g., mobile wallet provider computer encryption key) so that the sensitive payment information may be securely sent to the mobile wallet provider. The remote transaction application 1025 may have a third party encryption public key provisioned into the secure element 1022 or may use a public key certificate or other information in order to obtain the correct encryption key. Accordingly, the payment information may be encrypted with a third party server computer public key (e.g., mobile wallet provider public key) and the encrypted payment information may be sent to the third party service provider server computer (e.g., mobile wallet provider) for further remote transaction processing.

At step 1107, the encrypted payment information may then be sent to the remote transaction SDK 1024 or other remote transaction application 1025 on the mobile device 1020 that is capable of communicating the encrypted payment information to the third party server platform. The remote transaction SDK 1024 may then send the encrypted payment information to the third party server platform 130. It should be noted that because the third party private key is not known by the remote transaction SDK 1024, the merchant application 1021, the remote transaction application 1025, the mobile payment application 1023, or any other application or program located on the mobile device 1020, the encrypted payment information cannot be deciphered by any program on the mobile device 1020.

At step 1108, the third party server platform 130 may receive the encrypted payment information and may decrypt the payment information using the stored third party private key. Only the third party server system 130 may have access to the third party private key. Further, the third party server system 130 may validate the received payment information by checking to ensure that the correct third party public key was used to encrypted the payment information, that aspects of the payment information are correct (e.g., that the merchant identifier is associated with a registered merchant), and any other suitable validation that may ensure the encrypted payment information is being sent by a legitimate payment application, mobile device 1020, etc.

The third party server system 130 may then determine the appropriate merchant associated with the merchant identifier. A merchant identifier may be unique to the third party server system 130 and may include any information that identifies the merchant associated with the merchant application 1021 that originally generated the payee information. Merchants may register or otherwise complete a merchant "on-boarding" process with the third party server system 130 in order to be included in the heighted authentication e-commerce payment processing methods. Accordingly, the on-boarding or registration process may be performed between the merchant and the third party server system 130 prior to any transaction being performed and the merchant may provide merchant oriented public keys and other registration information (e.g., merchant address, etc.) to the third party system at that time. Accordingly, when the third party server system 130 decrypts the payment information and determines that a merchant identifier associated with a particular merchant is included, the third party server system 130 may determine a merchant public key associated with the identified merchant.

At step 1110, the mobile wallet provider computer 130 may use the determined merchant public key to re-encrypt the payment information using the merchant public key that was stored on the mobile wallet provider computer 130 during on-boarding or, in some embodiments, may be included with the payment information received from the remote transaction SDK 1024 or third party remote transaction application 1025 where the public key is included in a merchant certificate.

At steps 1111, the mobile wallet provider computer 130 may then send the re-encrypted payment information that was encrypted using the merchant public key to the merchant system. The merchant key encrypted payment information may be sent to the merchant through any suitable fashion. For example, the mobile wallet provider computer 130 may send the re-encrypted payment information to the remote transaction SDK 1024 or third party server layer application (step 1111), which then forwards the re-encrypted payment information to the merchant application 1021 (step 1112), which may then forward the re-encrypted payment information to the merchant system (step 1113). Alternatively, the mobile wallet provider computer 130 may send the re-encrypted payment information directly to the merchant system (not shown) or may send the re-encrypted payment information through another third party before being transmitted to the merchant system (not shown).

At step 1114, the merchant system receives the re-encrypted payment information from the merchant application 1021 and decrypts the encrypted merchant public key payment information using the stored merchant private key that is only known to the merchant system. Accordingly, the merchant system now has the payment information including a token, token authentication data, transaction data, and any other relevant information.

The merchant system may now populate the decrypted payment information including transaction data elements (e.g., token data elements) into an authorization request message and submit the authorization request message to an acquirer computer 1050. The authorization request message may seem like a typical authorization request message initiated by a merchant system during a card present transaction including a chip-based cryptogram or other dynamic value for authentication (e.g., the token authentication value).

At step 1115, the acquirer computer 1050 determines the appropriate payment processing network 1060 and forwards the authorization request message to the payment processing network 1060.

At step 1116, the payment processing network 1060 may determine that the token should be exchanged for a PAN or other account identifier in the token registry 1061 and that token authentication data should be generated using the token to ensure the data matches and thus, is validated as originating from a legitimate provisioned mobile payment application 1023 stored on a secure element 1022. The payment processing network 1060 may use any suitable method to determine the payment credentials include a token. For example, the dynamic value (e.g., token authentication value) may flag to the payment processing network 1060 that the transaction includes a token. Any other suitable information may be included to inform the payment processing network 1060 that the payment credentials include token information.

At step 1117, the token registry 1061 determines an account identifier and other account information associated with the token in the authorization request message and sends an updated authorization request message including the account identifier to the payment processing network 1060.

At step 1118, the payment processing network 1060 forwards the updated authorization request message to the issuer for risk and authorization decisioning. As explained previously in regards to step 922, if the issuer authorizes the transaction, the issuer may generate an authorization response message that may be transmitted back to the merchant and/or mobile device 1020 for completion of the transaction. Further, the token registry 1061 may replace the account identifier with the token in the authorization response message.

It should be understood that FIG. 11 is intended to be descriptive and non-limiting. Accordingly, additional steps may be performed and some steps may be skipped as well as additional entities may be included or removed from the description and flow diagram of FIG. 11.

A. Exemplary Elliptic Curve Cryptography Methods

Figure 12:
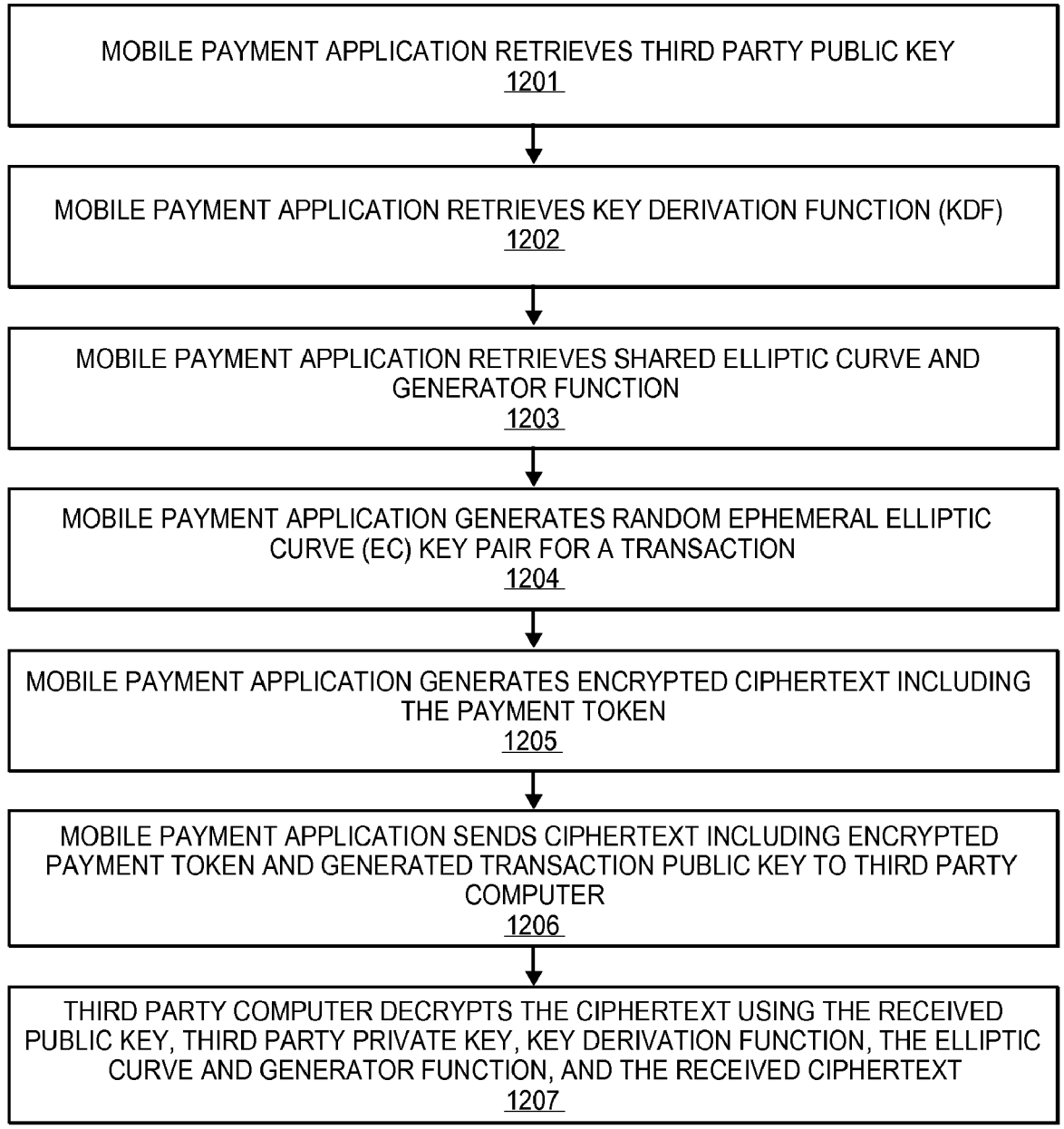
FIG. 12 shows a flow diagram of an exemplary method of encrypting and decrypting information using elliptic curve cryptography, according to some embodiments of the invention.

In some embodiments of the invention, elliptic curve cryptography (ECC) may be used to perform one or more of the encryption or decryption operations performed in the various transaction flow diagrams of the methods described herein. For example, in the context of the flow diagram of FIG. 12, elliptical curve cryptography may be used to encrypt and decrypt the payment information passed between the mobile wallet provider and the mobile payment application 1023.

For example, as explained above in reference to steps 1104-1108, the mobile payment application 1023 may obtain payment credentials from the secure element 1022, may encrypt the payment credentials, and may send the encrypted payment information to the mobile wallet provider computer. The mobile wallet provider computer may then use a private key to decrypt the encrypted payment information. In some embodiments, the mobile payment application 1023 and the mobile wallet provider computer may use elliptical curve cryptography (ECC) to encrypt and decrypt the payment information, respectively. In order to use elliptical curve cryptography, the mobile payment application 1023 and the server computer may have a shared message authentication function and a shared key derivation function.

A "key derivation function" may include any function or operation usable to determine one or more secret keys, such as symmetric keys or message authentication code (MAC) keys, or as otherwise known in the art. One example of a KDF may include an ANSI-X9.63-KDF with SHA-1 option.

At step 1201, the mobile payment application 1023 retrieves a server public key associated with the third party computer system. The third party computer public key may be retrieved in any suitable manner. For example, the server public key may be included on a certificate stored on the mobile device 1020, or may be resident in application storage or secure storage associated with mobile payment application 1023. The third party server system may store a server private key corresponding to the server public key.

At step 1202, the mobile payment application 1023 retrieves a key derivation function (KDF) to be used in the encryption process. In some embodiments of the invention, the KDF may be pre-determined, so that the third party server system and the mobile payment application 1023 are configured to use the same KDF. In other embodiments, the KDF used may be shared between the third party server system and the mobile payment application 1023.

At step 1203, the mobile payment application 1023 retrieves an elliptic curve and a generator function (e.g., P256) to be used in the encryption process. The elliptic curve and generator function are also known by the third party server system.

At step 1204, the mobile payment application 1023 generates a random ephemeral elliptic curve (EC) key pair associated with a payment transaction. The key pair may comprise a transaction private key and a transaction public key.

At step 1205, the mobile payment application 1023 generates encrypted ciphertext comprising the payment token. In some embodiments, the ciphertext may be generated using the server public key, the transaction private key, the key derivation function, the elliptic curve, the generator function, and the payment token. The ciphertext comprises the payment token, but is unreadable without the server private key.

At step 1206, the mobile payment application 1023 sends the encrypted token and the transaction public key to third party server system.

At step 1207, the third party server system decrypts the encrypted payment token. In some embodiments, the payment token may be decrypted using the transaction public key, the server private key, the key derivation function, the elliptic curve and the generator function, and the received encrypted payment token. The decrypted payment token may then be processed by third party server system.

Figure 13:
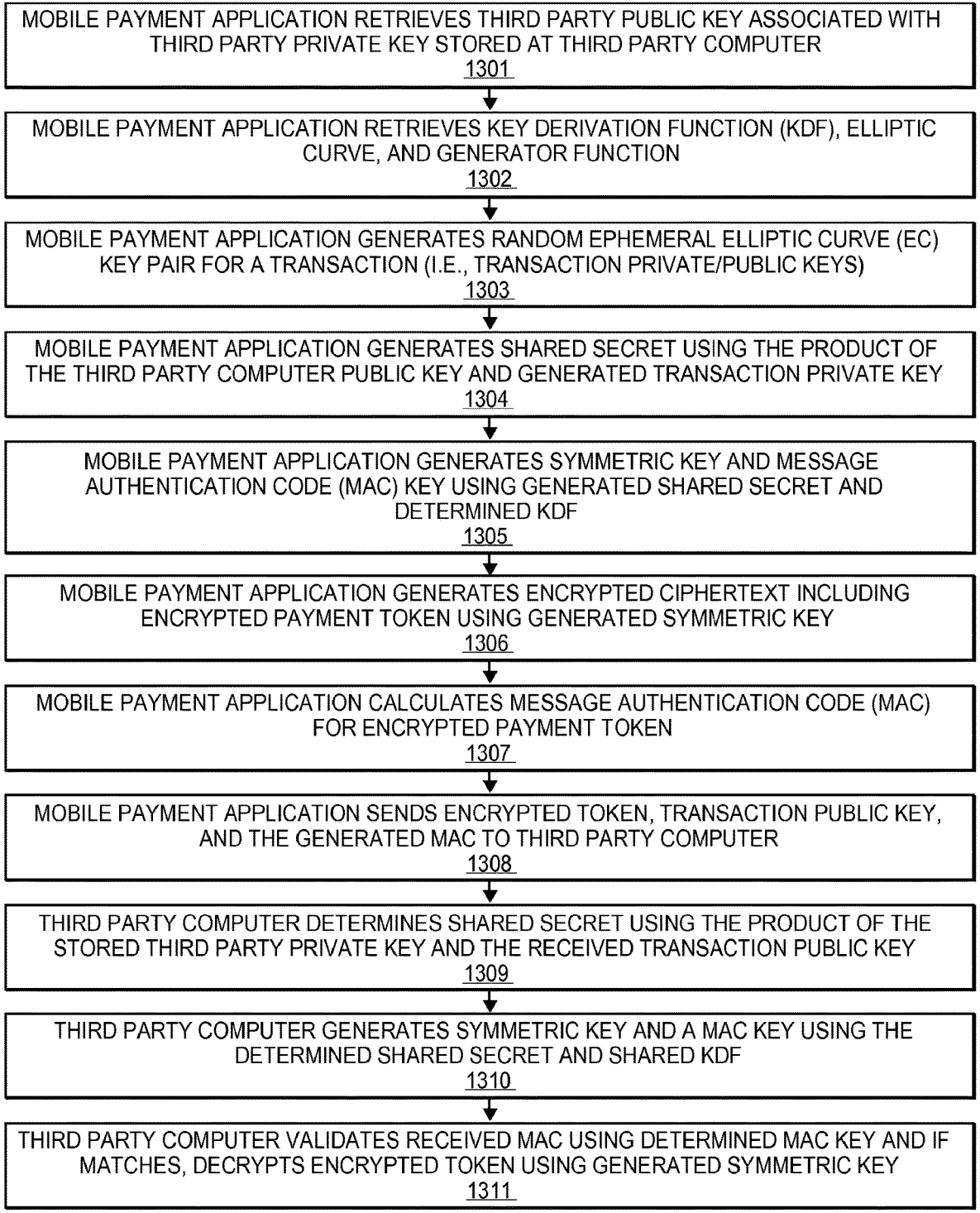
FIG. 13 shows a flow diagram of another exemplary method of encrypting and decrypting information using elliptic curve cryptography, according to some embodiments of the invention.

FIG. 13 shows another method for encrypting a payment token using ECC at a mobile payment application 1023 and subsequently decrypting the token at a third party server system. Steps 1301-1303 are the same as described above in relation to steps 1201-1204 of FIG. 13 and include the mobile payment application 1023 retrieving a third party server computer public key associated with the mobile wallet provider computer 1040, a key derivation function (KDF), an elliptic curve (e.g., P256), and a generator function to be used in the encryption process.

At step 1304, the mobile payment application 1023 generates a random ephemeral elliptic curve (EC) key pair associated with a payment transaction. The key pair may comprise a transaction private key and a transaction public key. In the embodiment of FIG. 13, the key pair may be generated such that the transaction public key is equal to the transaction private key multiplied by the generator function.

At step 1305, the mobile payment application 1023 generates a shared secret using the product of the server public key and transaction private key. It should be noted that the shared secret is also equal to the product of the server private key, the generator function, and the private transaction key. Similarly, the shared secret is also equal to the product of the server private key and the transaction public key.

At step 1306, the mobile payment application 1023 generates a symmetric key and a message authentication code (MAC) key using the shared secret determined at step 1305 and the KDF determined at step 1303. The symmetric key may be, for example, an AES encryption key. The MAC key may be, for example, a key used to generate a hash-based message authentication code (HMAC).

At step 1307, the mobile payment application 1023 generates encrypted ciphertext comprising the payment token. In some embodiments, the ciphertext may be generated using the symmetric key determined in step 1306. The ciphertext comprises the encrypted payment token, and is unreadable without the symmetric key.

At step 1308, the mobile payment application 1023 calculates a message authentication code (MAC) for the encrypted token. The MAC may be generated using the MAC key determined in step 1306, and any suitable MAC function, such as HMAC-SHA-256. The MAC may be generated in order verify that the encrypted token is not modified during transmission.

At step 1309, the mobile payment application 1023 sends the encrypted token, the transaction public key, and the MAC for the encrypted token to third party server system.

At step 1310, the third party server system determines the shared secret using the product of the server private key and the transaction public key received in step 13. It should be noted that although the shared secret was computed using different keys, it is the same as the shared secret computed by the mobile payment application 1023 in step 1305.

At step 1311, the third party server system generates a symmetric key and a message authentication code (MAC) key using the shared secret determined at step 1305 and the KDF determined at step 1303. It should be noted that as the shared secret and KDF are the same as those used by the mobile payment application 1023, the symmetric key and MAC key are the same as used to generate the encrypted token and MAC received by the third party server system at step 1309.

At step 1312, the third party server system calculates the MAC of the received encrypted token using the MAC key determined at step 1306. If the calculated MAC does not match the MAC received at step 1309, a corruption of the encrypted token is determined and the method results in an error. This may cause, for example, the third party server system to request a retransmission of the encrypted token. If the calculated MAC and received MAC match, then the method proceeds to step 1313.

At step 1313, the third party server system decrypts the encrypted token using the symmetric key determined at step 1311. The decrypted payment token may then be processed by the third party server system.

IV. Exemplary Computer Apparatus

Figure 14:
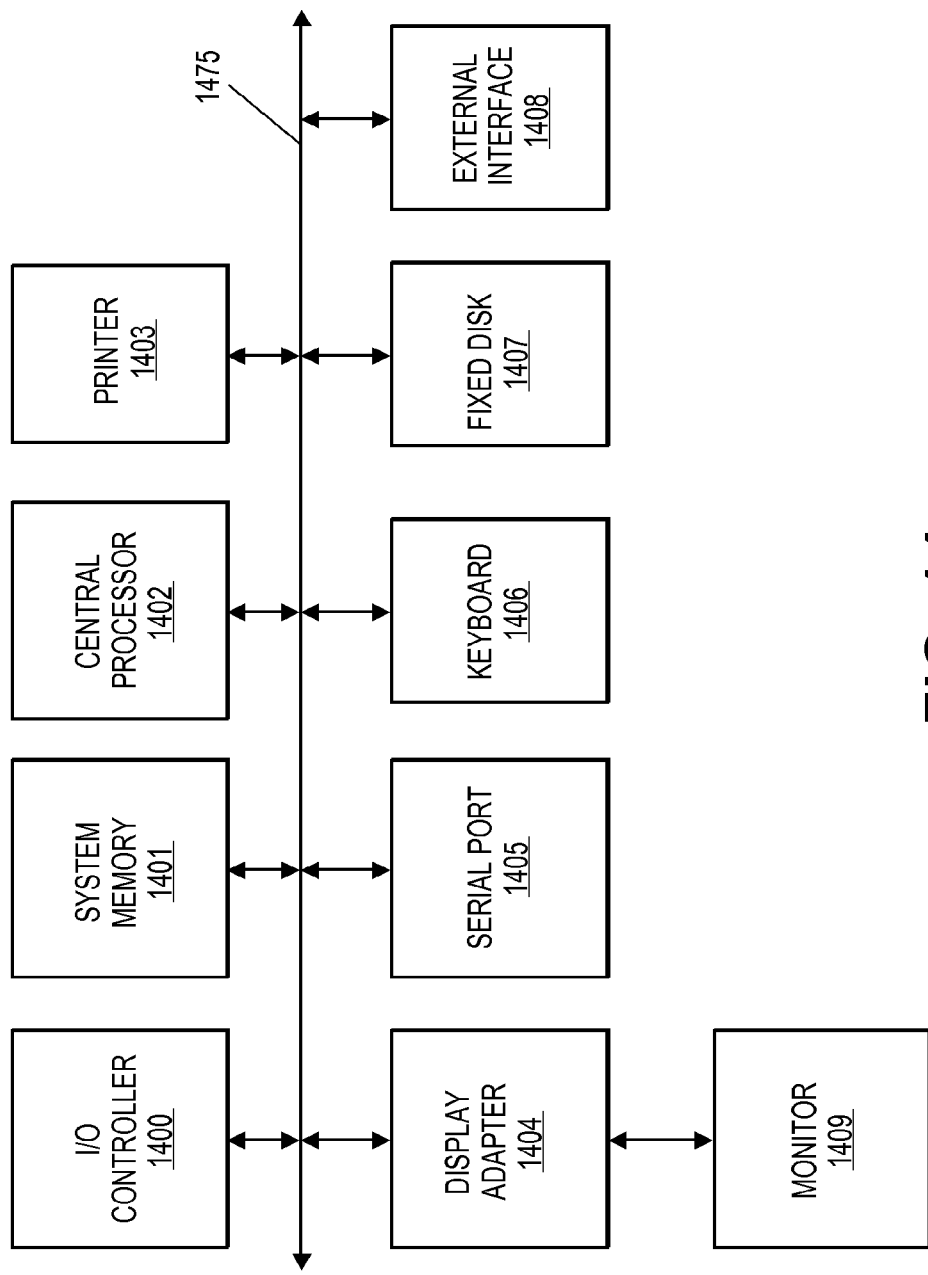
FIG. 14 shows a block diagram of an exemplary computer apparatus.

FIG. 14 is a high level block diagram of a computer system that may be used to implement any of the entities or components described above. The subsystems shown in FIG. 14 are interconnected via a system bus 1475. Additional subsystems include a printer 1403, keyboard 1406, fixed disk 1407, and monitor 1409, which is coupled to display adapter 1404. Peripherals and input/output (I/O) devices, which couple to I/O controller 1400, can be connected to the computer system by any number of means known in the art, such as a serial port. For example, serial port 1405 or external interface 1408 can be used to connect the computer apparatus to a wide area network such as the Internet, a mouse input device, or a scanner. The interconnection via system bus 1475 allows the central processor 1402 to communicate with each subsystem and to control the execution of instructions from system memory 1401 or the fixed disk 1407, as well as the exchange of information between subsystems. The system memory 1401 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
providing, by a mobile application on a mobile device to a transaction processor, encrypted payment information;
generating, by the transaction processor, a payment request including the encrypted payment information;
transmitting, by the transaction processor, the payment request to a server computer, wherein the server computer (i) receives the encrypted payment information, (ii) decrypts the encrypted payment information using a third party key, (iii), determines a transaction processor public key, (iv) re-encrypts the payment information with a transaction processor public key, and (v) transmits the re-encrypted payment information to the transaction processor;
decrypting, by the transaction processor, the re-encrypted payment information with a transaction processor private key to obtain the payment information; and
initiating, a payment transaction by the transaction processor using the payment information.

2. The method of claim 1, wherein the transaction processor is a transaction processor application on the mobile device.

3. The method of claim 1, wherein the transaction processor is a merchant computer or a merchant application.

4. The method of claim 1, wherein the payment request includes a transaction processor certificate, and wherein the server computer further
validates that the transaction processor certificate is authentic;
verifies that the transaction processor certificate is currently valid with a certificate authority; and
extracts the transaction processor public key from the transaction processor certificate.

5. The method of claim 1, wherein the server computer is a remote key manager computer.

6. The method of claim 1, wherein the payment transaction is initiated by the transaction processor by generating, by the transaction processor, an authorization request message and transmitting the authorization request message to an issuer computer for authorization.

7. The method of claim 1, wherein the encrypted payment information includes encrypted payment credentials and unencrypted transaction information.

8. The method of claim 1, wherein the method further comprises, before providing the encrypted payment information:
receiving, by the mobile application, payee information from the transaction processor.

9. The method of claim 1, wherein the payment information comprises a primary account number or a payment token.

10. The method of claim 1, wherein the third party key is a third party private key.

11. A mobile device comprising: a processor; and
a computer readable medium comprising code, executable by the processor, for implementing a method comprising:
providing, by a mobile application on the mobile device to a transaction processor, encrypted payment information;
generating, by the transaction processor, a payment request including the encrypted payment information;
transmitting, by the transaction processor, the payment request to a server computer, wherein the server computer (i) receives the encrypted payment information, (ii) decrypts the encrypted payment information, (iii), determines a transaction processor public key, (iv) re-encrypts the payment information with a transaction processor public key, and (v) transmits the re-encrypted payment information to the transaction processor;
decrypting, by the transaction processor, the re-encrypted payment information with a transaction processor private key to obtain the payment information; and
initiating, a payment transaction by the transaction processor using the payment information.

12. The mobile device of claim 11, wherein the mobile device is a mobile phone.

13. The mobile device of claim 11, wherein the transaction processor is a merchant application.

14. The mobile device of claim 11, wherein
the transaction processor interacts with the mobile application before the mobile application provides the encrypted payment information.

15. The mobile device of claim 11, wherein the encrypted payment information includes an encrypted PAN.

16. The mobile device of claim 11, wherein the payment transaction is initiated by the transaction processor by generating, by the transaction processor, an authorization request message and transmitting the authorization request message to an issuer computer for authorization.

17. The mobile device of claim 11, wherein the encrypted payment information includes encrypted payment credentials and unencrypted transaction information.

18. The mobile device of claim 11, wherein the mobile application is a mobile payment application.

* * * * *